(12) United States Patent
Al-Marzouqi et al.

(10) Patent No.: US 12,524,654 B2
(45) Date of Patent: Jan. 13, 2026

(54) METACOGNITIVE SEDENION-VALUED NEURAL NETWORKS

(71) Applicant: Khalifa University of Science and Technology, Abu Dhabi (AE)

(72) Inventors: Hasan Al-Marzouqi, Abu Dhabi (AE); Lyes Saad Saoud, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 1030 days.

(21) Appl. No.: 17/581,767

(22) Filed: Jan. 21, 2022

(65) Prior Publication Data

US 2022/0237437 A1 Jul. 28, 2022

Related U.S. Application Data

(60) Provisional application No. 63/141,736, filed on Jan. 26, 2021.

(51) Int. Cl.
*G06N 3/04* (2023.01)
*G06N 3/047* (2023.01)
*G06N 3/048* (2023.01)
*G06N 3/08* (2023.01)
*G06N 3/084* (2023.01)

(52) U.S. Cl.
CPC ............ *G06N 3/048* (2023.01); *G06N 3/047* (2023.01); *G06N 3/084* (2013.01)

(58) Field of Classification Search
None
See application file for complete search history.

(56) References Cited

U.S. PATENT DOCUMENTS

2020/0117993 A1* 4/2020 Martinez-Canales ........................ G06N 3/045
2022/0061818 A1* 3/2022 Takeshima ............ G06N 3/045

OTHER PUBLICATIONS

Qiu, Xinchi, et al. "Quaternion neural networks for multi-channel distant speech recognition." arXiv preprint arXiv:2005.08566 (2020). (Year: 2020).*
Vieira, Guilherme, and Marcos Eduardo Valle. "Extreme Learning Machines on Cayley-Dickson Algebra Applied for Color Image Auto-Encoding." 2020 International Joint Conference on Neural Networks (IJCNN). IEEE, 2020. (Year: 2020).*

(Continued)

*Primary Examiner* — Hal Schnee
(74) *Attorney, Agent, or Firm* — Kilpatrick Townsend & Stockton LLP

(57) ABSTRACT

Methods and systems for implementing sedenion value neural network models are provided. A method includes obtaining, from a data store or a user device, values associated with a feature for which a value is to be determined. The method includes generating an input sedenion using the values and inputting the input sedenion to a sedenion value neural network (SVNN) model configured to generate an output sedenion using the input sedenion. The output sedenion may indicate a sedenion representation of the value to be determined. The method includes generating a sequence of real values using the output sedenion. The sequence may be or include the value. The method also includes outputting, to the data store or to the user device, the sequence of real values.

20 Claims, 8 Drawing Sheets

(56) References Cited

OTHER PUBLICATIONS

Hongo, Shuto, et al. "Constructing convolutional neural networks based on quaternion." 2020 International Joint Conference on Neural Networks (IJCNN). IEEE, 2020. (Year: 2020).*

De Castro, Fidelis Zanetti, and Marcos Eduardo Valle. "A broad class of discrete-time hypercomplex-valued Hopfield neural networks." Neural Networks 122 (2020): 54-67. (Year: 2020).*

Çevik, Hasan Hüseyin, Yunus Emre Acar, and Mehmet Çunkaş. "Day ahead wind power forecasting using complex valued neural network." 2018 International Conference on Smart Energy Systems and Technologies (SEST). IEEE, 2018. (Year: 2018).*

Cimen, Cennet. "Algebraic Properties of the h (x)-Lucas Sedenion Polynomials." Mathematical Studies and Applications 2018 Oct. 4-6, 2018 (2018): 281. (Year: 2018).*

A. Hirose. Complex-Valued Neural Networks: Advances and Applications. Wiley-IEEE Press, May 2013.

L. Saad Saoud, R. Ghorbani, F. Rahmoune, "Cognitive Quaternion Valued Neural Network and some applications", Neurocomputing, vol. 221, pp. 85-93, 2017, Elsevier.

Bin Yang ; Wei Zhang ; Li-Na Gong ; Huai-Zhi Ma, Finance time series prediction using complex-valued flexible neural tree model, 13th International Conference on Natural Computation, Fuzzy Systems and Knowledge Discovery (ICNC-FSKD), Jul. 29-31, 2017, Guilin, China.

S. Mao and F. Xiao, "Time Series Forecasting Based on Complex Network Analysis," in IEEE Access, vol. 7, pp. 40220-40229, 2019.

Parcollet T, Ravanelli M, Morchid M, Linarès G, Trabelsi C, De Mori R, Bengio Y. Quaternion recurrent neural networks. arXiv preprint arXiv:1806.04418. Jun. 12, 2018.

X. Cheng, J. He, J. He and H. Xu, "Cv-CapsNet: Complex-Valued Capsule Network," in IEEE Access, vol. 7, pp. 85492-85499, 2019.

B. C. Ujang, C.C. Took, D. P. Mandic, Quaternion-Valued Nonlinear Adaptive Filtering, IEEE Transactions on Neural Networks, 22(8), (2011) 1193-1206.

L. Saad Saoud, R. Ghorbani, "Metacognitive Octonion Valued Neural Network and its time series applications", IEEE Transactions on Neural Networks and Learning Systems, vol. 31, No. 2, pp. 539-548, 2020.

J-H. Conway, and D-A. Smith. On Quaternions and Octonions. Taylor & Francis, Jan. 23, 2003.

R. Savitha, S. Suresh, and N. Sundararajan. "Metacognitive Learning in a Fully Complex Valued Radial Basis Function Neural Network." Neural Computation, 24(5), (2012) 1297-1328.

G. Sateesh Babu, S. Suresh, Meta-cognitive neural network for classification problems in a sequential learning framework, Neurocomputing 81(1), (2012) 86-96.

K. Subramanian, S. Suresh, N. Sundararajan, A metacognitive neuro-fuzzy inference system (MC-FIS) for sequential classification problems, IEEE Transactions on Fuzzy Systems 21(6), (2013) 1080-1095.

K. Subramanian, A. Das, S. Suresh, R. Savitha, A Meta-cognitive Interval Type-2 fuzzy inference system classifier and its projection based learning algorithm, IEEE Conference on Evolving and Adaptive Intelligent Systems (EAIS), Apr. 16-19, 2013, Singapore, pp. 48-55.

Yang Liu, Wei Wang, Noradin Ghadimi, Electricity load forecasting by an improved forecast engine for building level consumers, Energy 139 (2017) 18-30.

Hua Leng, Xinran Li, Jiran Zhu, Haiguo Tang, Zhidan Zhang, Noradin Ghadimi, A new wind power prediction method based on ridgelet transforms, hybrid feature selection and closed-loop forecasting, Advanced Engineering Informatics 36 (2018) 20-30.

Farzaneh Mirzapour, Mostafa Lakzaei, Gohar Varamini, Milad Teimourian, Noradin Ghadimi, A new prediction model of battery and wind-solar output in hybrid power system. J Ambient Intell Human Comput 10, 77-87 (2019).

L. Munkhdalai, T. Munkhdalai, K. H. Park, H. G. Lee, M. Li and K. H. Ryu, "Mixture of Activation Functions with Extended Min-Max Normalization for Forex Market Prediction," in IEEE Access, vol. 7, pp. 183680-183691, 2019.

S. W. Fleming and A. G. Goodbody, "A Machine Learning Metasystem for Robust Probabilistic Nonlinear Regression-Based Forecasting of Seasonal Water Availability in the US West," in IEEE Access, vol. 7, pp. 119943-119964, 2019.

A. F. W. Ho, B. Z. Y. S. To, J. M. Koh and K. H. Cheong, "Forecasting Hospital Emergency Department Patient Volume Using Internet Search Data," in IEEE Access, vol. 7, pp. 93387-93395, 2019.

F. Liu and Y. Deng, "A Fast Algorithm for Network Forecasting Time Series," in IEEE Access, vol. 7, pp. 102554-102560, 2019.

F. Shang, A. Hirose, PolSAR land classification by using quaternion-valued neural networks. Asia-Pacific Conference on Synthetic Aperture Radar (APSAR), Sep. 23-27, 2013, Tsukuba, Japon, pp. 593-596.

Gang Wang and Rui Xue Quaternion Filtering Based on Quaternion Involutions and its Application in Signal Processing, IEEE access, pp. 149068-149079, 2019.

H. Kusamichi, T. Isokawa, N. Matsui, A New Scheme for Color Night Vision by Quaternion Neural Network, 2nd International Conference on Autonomous Robots and Agents, Dec. 13-15, 2004, Palmerston North, New Zealand.

C-R. Li, J-P. Li, X-C. Yang, Z-W. Liang, Gait recognition using the magnitude and phase of quaternion wavelet transform, International Conference on Wavelet Active Media Technology and Information Processing (ICWAMTIP), Chengdu, 2012, pp. 322-324.

W.K. Wong, C.K. Loo, W.S. Lim, P.N. Tan, Quaternion Based Thermal Condition Monitoring System. Natural Computing, Proceedings in Information and Communications Technology, 2 (2010) 352-362.

Jörg Zumbach, Lydia Rammerstorfer, Ines Deibl, Cognitive and metacognitive support in learning with a serious game about demographic change, Computers in Human Behavior, vol. 103, pp. 120-129, 2020.

K. Carmody. Circular and Hyperbolic Quaternions, Octonions, and Sedenions, Applied Mathematics and Computation, 28:47-72 (1988).

S. Hansun, "A new approach of moving average method in time series analysis," 2013 IEEE Conference on New Media Studies (CoNMedia), Tangerang, 2013, pp. 1-4.

Jian Cao, Zhi Li, Jian Li, Financial time series forecasting model based on CEEMDAN and LSTM, Physica A: Statistical Mechanics and its Applications, 519, Apr. 1, 2019, pp. 127-139.

Hyeong Kyu Choi, Stock Price Correlation Coefficient Prediction with ARIMA-LSTM Hybrid Model, 2018, https://arxiv.org/pdf/1808.01560.pdf.

Sungil Kim, Heeyoung Kim, A new metric of absolute percentage error for intermittent demand forecasts, International Journal of Forecasting 32 (2016) 669-679.

R.H. Abiyev. "Fuzzy Wavelet Neural Network Based on Fuzzy Clustering and Gradient Techniques for Time Series Prediction." Neural Computing & Application, 20, pp. 249-259 (2011).

C G Rojas and M Herman (2018). Foreign exchange forecasting via machine learning. http://cs229.stanford.edu/proj2018/report/76.pdf.

M. Parsapoor, U. Bilstrup and B. Svensson, "Forecasting Solar Activity with Computational Intelligence Models," in IEEE Access, vol. 6, pp. 70902-70909, 2018.

Z. Liu, C. K. Loo, N. Masuyama and K. Pasupa, "Recurrent Kernel Extreme Reservoir Machine for Time Series Prediction," in IEEE Access, vol. 6, pp. 19583-19596, 2018.

H.I. Abdel-Rahman, B.A. Marzouk, Statistical method to predict the sunspots number, NRIAG Journal of Astronomy and Geophysics 7 (2018) 175-179.

Goutami Chattopadhyay, Surajit Chattopadhyay, Monthly sunspot number time series analysis and its modeling through autoregressive, The European Physical Journal Plus, 2012, pp. 127:43, Springer Berlin Heidelberg.

Paria Akbary, Mohammad Ghiasi, Mohammad Reza Rezaie Pourkheranjani, Hamidreza Alipour, Noradin Ghadimi, Extracting Appropriate Nodal Marginal Prices for All Types of Committed Reserve. Comput Econ 53, 1-26 (2019).

(56) References Cited

OTHER PUBLICATIONS

Melika Hamian, Ayda Darvishan, Mehdi Hosseinzadeh, Milad Janghorban Lariche, Noradin Ghadimi, Alireza Nouri, A framework to expedite joint energy-reserve payment cost minimization using a custom-designed method based on Mixed Integer Genetic Algorithm, Engineering Applications of Artificial Intelligence 72 (2018) 203-212.

Gholamreza Aghajani and Noradin Ghadimi, G. Aghajani, N. Ghadimi, Multi-objective energy management in a micro-grid, Energy Rep., (Nov. 4, 2018), pp. 218-225.

A. T. Eseye, M. Lehtonen, T. Tukia, S. Uimonen and R. John Millar, "Machine Learning Based Integrated Feature Selection Approach for Improved Electricity Demand Forecasting in Decentralized Energy Systems," in IEEE Access, vol. 7, pp. 91463-91475, 2019.

Alberto Quesada, Electricity Demand Forecasting using machine learning, https://www.neuraldesigner.com/blog/electricity_demand_forecasting, accessed on Dec. 22, 2019.

B. Ustaoglu, H. K. Cigizoglu and M. Karaca, Forecast of daily mean, maximum and minimum temperature time series by three artificial neural network methods, Meteorological Applications, Wiley InterScience, 15, pp. 431-445, 2008.

Shyi-Ming Chen, and Jeng-Ren Hwang, Temperature Prediction Using Fuzzy Time Series, IEEE Transactions on Systems, Man, and Cybernetics—Part B: Cybernetics, vol. 30, No. 2, Apr. 2000.

J. M. Corchado, Hybrid CBR system for real-time temperature forecasting in the ocean, IEEE Colloquium on Knowledge Discovery (London England UK). 1995.

Georgia Papacharalampous, Hristos Tyralis, Demetris Koutsoyiannis, Predictability of monthly temperature and precipitation using automatic time series forecasting methods, Acta Geophysica (2018) 66:807-831.

\* cited by examiner

METACOGNITIVE SEDENION-VALUED NEURAL NETWORKS

CROSS-REFERENCE TO RELATED APPLICATIONS

This application claims the benefit of U.S. Provisional Application No. 63/141,736 filed Jan. 26, 2021, the entire contents of which are hereby incorporated for all purposes in their entirety.

TECHNICAL FIELD

Systems and methods for improved modeling and/or prediction of sequential data are presented. In particular, the present disclosure relates to techniques for using sedenion value neural network models and metacognitive training methods for modeling and/or prediction of data of nonstationary and nonlinear systems.

BACKGROUND

Nonlinear and nonstationary dynamics in data sequences present challenges for modeling and prediction systems. For example, daily surface temperature measurements over annual timescales may exhibit nonlinear dynamics on multiple scales (seasonal, daily, etc.) such that ab initio prediction inaccurately predicts future daily surface temperatures outside a short time frame. Typically, neural network approaches predict nonlinear systems by combining deep neural networks, ensemble neural networks, or combining neural network models with evolutionary learning algorithms.

BRIEF SUMMARY

A value determination system is a system capable of modeling and/or predicting real-valued sequential data using a neural network model operating on sedenion values. A system may include one or multiple machine learning (ML) models, such as a sedenion value neural network (SVNN) model, and training algorithms, such as supervised training facilitated by metacognitive training techniques.

The present disclosure relates to techniques for obtaining sequential data, generating a sedenion-value sequence from the sequence data, using an SVNN to generate an output sedenion, generating a real-value sequence from the output sedenion, and outputting the real-value sequence to facilitate application of the model output in associated systems. Using the SVNN method provides numerous advantages over conventional approaches, including, but not limited to, an efficient and compact representation of input data that better captures the relationships between data points in sequences that can be applied to time-series forecasting, image processing, speech recognition, and computer vision, as examples of modeling nonlinear, high-dimensional systems. Furthermore, metacognitive learning strategies may provide significantly improved prediction results and reduced convergence time in multiple classifications and prediction problems. In particular, memory consumption may be reduced by more than three times, relative to real-valued recurrent networks. Accuracy and performance of prediction and/or modelling may be significantly improved over existing machine-learning techniques.

In some embodiments, a method includes obtaining, from a data store or a user device, values associated with a feature for which a value is to be determined. The method may include generating an input sedenion using the values. The method may include inputting the input sedenion to a sedenion value neural network (SVNN) model configured to generate an output sedenion using the input sedenion, the output sedenion indicating a sedenion representation of the value to be determined. The method may include generating a sequence of real values using the output sedenion, the sequence comprising the value. The method may also include outputting, to the data store or to the user device, the sequence of real values.

In some embodiments, the SVNN model may include an input layer, configured to receive the input sedenion and to apply weights to the input sedenion. The SVNN may include a hidden layer, configured to receive the weighted input sedenion from the input layer and to apply an activation function to the weighted sedenion value. The SVNN may also include an activation layer, configured to receive the activated sedenion value and to apply a sigmoid function to the activated sedenion value. The activation function may be or include a rectifier linear unit (ReLU) function. the value to be determined may be extrapolated from a sequence of values, and wherein the values comprise the sequence of values.

In some embodiments, the method may include training the SVNN using a metacognitive selection technique. The metacognitive selection technique may include obtaining deletion threshold values, training threshold values, and a training sequence associated with the value to be determined. The technique may include inputting a training sedenion of the training sequence to the SVNN. The technique may include generating a training output of the SVNN. The technique may include estimating a magnitude and a plurality of sedenion phases of the training output. The technique may include comparing the magnitude and the sedenion phases to the deletion threshold values. The technique may also include in accordance with the magnitude and the sedenion phases satisfying the deletion threshold values: comparing the magnitude and the sedenion phases to the training threshold values and in accordance with the magnitude and the sedenion phases satisfying the training threshold values, training the SVNN using the training sedenion. The technique may also include, in accordance with the magnitude and the sedenion phases not satisfying the training threshold values, reserving the training sedenion for a subsequent epoch of the metacognitive selection technique. Training the SVNN using the training sedenion may include generating a training output of the SVNN using the training sedenion, estimating an error using the training output and an expected output from to the training sequence, and modifying one or more parameters of the SVNN in accordance with an objective function. The magnitude of the training output may be estimated by $$M = |e| = \frac{1}{s}\sqrt{e^c e},$$

the plurality of sedenion phases may be estimated by $$\theta_i = \arctan\left(\frac{\sqrt{\sum_{p=2}^{16} x_p^2}}{x_i}\right)$$

and M may be the magnitude, $\theta_i$ may be the plurality of sedenion phases, e may be Euler's number, $x_p$ may be a real value input, and C may be the Cayley operator. Outputting the sequence of real values may be generating a visualization comprising the sequence of real values and presenting the visualization on a display.

In some embodiments, the input sequence may be or include daily power consumption data, wherein the value to be determined comprises a predicted future state of daily power consumption. The method may include facilitating an activation or a deactivation of a power generation system, in accordance with the predicted future state of daily power consumption exceeding the set point value.

In some embodiments, the feature may be a first feature, and the input sequence may include values of a second feature that is associated with the first feature. The output sedenion may be a first output sedenion, the feature may be a first feature, the value to be determined may be a first value to be determined, and the SVNN model may be further configured to generate, using the input sedenion, a second output sedenion indicating a sedenion representation of a second value to be determined for a second feature. The input sequence may be a first input sequence, the output sedenion may be a first output sedenion, the feature may be a first feature, the value to be determined may be a first value to be determined, and the SVNN model may be further configured to input a second input sedenion generated from a second input sequence and to generate, using the second input sedenion, a second output sedenion indicating a sedenion representation of a second value to be determined for a second feature.

In certain embodiments, a computer system includes one or more processors and a memory in communication with the one or more processors, the memory configured to store computer-executable instructions, wherein executing the computer-executable instructions causes the one or more processors to perform one or more of the steps of the method or its variations described above.

In certain embodiments, a computer-readable storage medium stores computer-executable instructions that, when executed, cause one or more processors of a computer system to perform one or more steps of the method or its variations described above.

The foregoing, together with other features and embodiments will become more apparent upon referring to the following specification, claims, and accompanying drawings.

DETAILED DESCRIPTION

Figure 1:
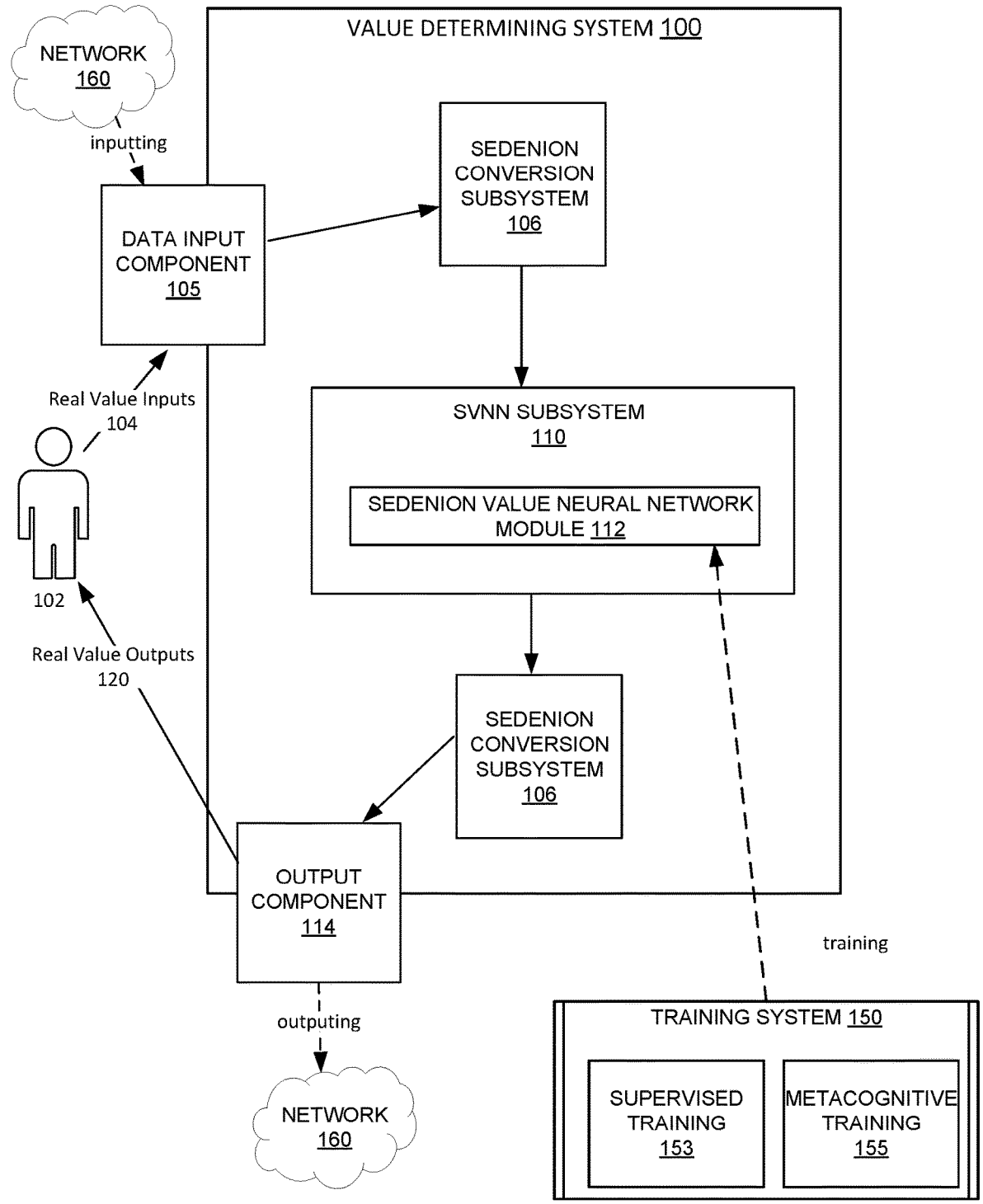
FIG. 1 is a diagram of a value determining system incorporating a sedenion conversion subsystem, an SVNN subsystem, and a training system, according to embodiments described herein.

A trainable sedenion value neural network (SVNN) real-value determination system is provided that is capable of storing, processing, and predicting and/or modeling real-value sequence data from input sequences. The real value to be determined may be associated with a feature of a system. As used herein, a "feature" refers to an element having an attribute that can take a value, where the value can depend on one or more past values of the attribute, other attributes of the feature and/or other features. Temperature, atmospheric pressure, pixels, power consumption, etc. are examples of a feature. The trainable real-value determination system may be provided in a stand-alone device, as a cloud-accessible service, or the like. In each of these forms, the system is capable of accessing and/or receiving data through a network connection and/or a user interface, determining a sedenion value sequence using the data, inputting the sedenion value sequence to a trained SVNN machine-learning model, generating an output sedenion value sequence using the trained SVNN machine-learning model, generating a real-value sequence from the output sedenion value sequence, and outputting the real-value sequence. In some instances, outputting the result includes outputting the result to a server control system, such that this system can determine whether to facilitate actions of a device associated with the real value sequence (e.g., to facilitate scheduling a power generation peaking facility to activate or deactivate based on predicted power consumption, or to present data using a display or other peripheral).

The SVNN machine-learning model techniques provided herein provide advantages over techniques that rely on real-value sequences. While a computing system may use a real-value sequence to predict and/or model correlated variables (e.g., time-series forecasting, speech recognition, and computer vision), loss of information may limit accuracy and introduce significant memory costs to neural network processes. To that end, techniques disclosed herein that use SVNN machine-learning models may provide improved prediction quality when compared with real valued networks, for example, as measured by root mean square error of prediction. In some cases, improvement may be attributed to increasing the number of complex dimensions used, by which SVNN machine-learning models may better capture correlations between the data samples. To that end, in some embodiments, a value determining system may include a trained SVNN machine-learning model, (e.g., a neural network configured to process sedenion values to predict and/or model real-value sequences). In some embodiments, the value determining system may implement a metacognitive training system, which may be implemented as a separate system or as part of the value determining system. The metacognitive training system may be configured to facilitate training the SVNN machine-learning model (e.g., by supervised learning) at least in part by comparing the prediction error of a sample with thresholds that control the speed of the learning process.

Furthermore, the techniques, methods, and systems described herein may provide improvement to computer systems configured to implement neural network models, for example, as single input-single output, single input-multiple output, or multiple input-multiple output predictive or modelling systems. In some embodiments, SVNN models may be implemented in neural networks with reduced complexity, relative to real value neural network systems or statistical methods that may produce similar (but yet inferior) accuracy. For example, an SVNN may predict and/or model sequence data with improved accuracy, and may be trained using relatively smaller training sets, with fewer hidden layers and/or fewer neurons. For example, an SVNN may have as few as half the number of neurons, or fewer, while only using twenty percent more parameters. In this way, memory demand on computer systems configured to operate an SVNN may be reduced.

FIG. 1 is a diagram of a value determining system 100 incorporating a sedenion conversion subsystem 106, an SVNN subsystem 110, and a training system 150, according to embodiments described herein. The detection system 100 is configured to receive interaction inputs 104, also referred to as input data, such as through a user interface, using a data input component 105. The input data may be provided by a human user 102 or may be obtained by an automated system in communication with a data store, such as a database of real-value sequence data, such as time-series data, image and/or voice data, or natural language text. In some embodiments, data input may further include data preparation, such as cleaning and de-densification. As an illustrative example, in the case of time-series data for prediction and/or modelling, data preparation may include ordering the input data 104 by time stamp and removing duplicate events.

The value determining system 100 may perform or cause one or more actions to be performed using the input data 104, for instance, by using the sedenion conversion subsystem 106 and the SVNN subsystem 110, which utilizes the sedenion value neural network model 112. In this way, the value determining system 100 may process input data 104 using the SVNN subsystem 110, and may output a real value sequence, such as by way of a output component 116. The output component 116 can be or include a virtual network interface card or a physical router device that can output data to a network 160, for example, to associated display devices, internet of things (IoT) networks, or process control systems, as described in more detail in reference to FIGS. 2-4. As an illustrative example, the output component 116 may be communicatively coupled with one or more display devices, permitting the presentation of visualizations of output of one or more subsystems of the value determining system 100. For example, output data including real-value sequences may be presented for user review or interaction.

In some embodiments, the value determining system 100 is a specialized computing system that may be used for processing large amounts of data potentially using a large number of computer processing cycles. The numbers of devices depicted in FIG. 1 are provided for illustrative purposes. Different numbers of devices may be used. For example, while each device, server, and system in FIG. 1 is shown as a single device, multiple devices may be used instead.

In some embodiments, the processing performed by the value determining system 100 is implemented by a pipeline of components or subsystems. The subsystems listed above may be implemented in hardware hosting software (e.g., using code, a program, or instructions executable by one or more processors or cores), or in hardware only. In certain implementations, one or more of the subsystems may be combined into a single subsystem. Additionally or alternatively, in some implementations, the functions described herein as performed by a particular subsystem may be implemented by multiple subsystems.

The data input component 105 includes hardware and software configured to receive input data 104. In some instances, the data input component 105 may be part of the value determining system 100. In some other instances, the data input component 105 may be separate from and be communicatively coupled with the detection system 100. The data input component 105 may, for example, include data input hardware and software communicatively coupled to a data collection system. For example, the data input component 105 may be or include a network communication interface, such as a virtual network interface card or a physical router device, configured to communicate with other computing systems over a network 160. In this way, the value determining system 100 may obtain data automatically (e.g., without human intervention) as part of the prediction and/or modelling of sequential data. In an illustrative example, the data input component 105 may include an application programming interface (API) in communication with the sedenion conversion subsystem 106 or other subsystems of the value determining system 100, configured to interface with computer systems over the network 160. In another illustrative example, the data input component 105 may include a personal computer configured to receive a set of input data 104 for processing by the subsystems of the detection system 100.

The sedenion conversion subsystem 106 is configured to access and/or receive input data 104 and to generate a sedenion value input sequence for the SVNN subsystem 110. A sedenion can be described mathematically as $$o^{def} = x_1 + i_1 x_2 + i_2 x_3 + \ldots i_{15} x_{16} = x_1 + \Sigma_{k=1}^{15} i_k x_{k+1} \quad (1)$$

Where $x_1, x_2, \ldots, x_{16} - \mathbb{R}$, and $i_n^2 = -1$, $\forall n = 1 \ldots 15$.

The conjugate of a sedenion number is $$o^{*def} = x_1 - \Sigma_{r=1}^{15} i_r x_{r+1} \quad (2)$$

In this way, the sedenion conversion subsystem 106, may take in a real value sequence ($x_i$) having more than sixteen data points, and may use the expressions of equations (1) and (2) to generate a sequence of sedenion values, each incorporating information of sixteen real values. In reference to equations (1) and (2), the inputs to the sedenion conversion subsystem 106 includes real values that are input to equation (1), the output of which is "O," the sedenion value. Sedenion numbers are non-commutative, non-alternative, and non-associative, which involves a different approach to computation than that employed for real value neural network models or statistical methods. As described in more detail in reference to potential applications of the value determining system 100, the real value sequence, as input data 104, may be or include as many as hundreds of data points, thousands of data points, tens of thousands of data points, or more. A sedenion value sequence "O" may be generated by shifting the base index "k=1" by one index value of the input data 104 for each sedenion value.

In some embodiments, modelling and/or prediction of real value sequences is implemented by the SVNN subsystem 110 using the sedenion value neural network model 112. As described in more detail in reference to FIG. 5, an SVNN may describe a machine-learning neural network model similar to a real-valued neural network, with the exception that all values inside and outside the SVNN are sedenion numbers. In this way, the SVNN subsystem 110 accesses or receives input sedenion sequences prepared by the sedenion conversion subsystem 106. The SVNN subsystem 110 may also receive or access threshold data, which may be used as part of metacognitive training of the sedenion value neural network model 112.

In some embodiments, the SVNN subsystem 110 may be configured with one or more sedenion value neural network models 112, as part of implementing multiple input-multiple output approaches. For example, a single input-single output (SISO) SVNN model 112 may be configured as described in more detail in reference to FIGS. 2-4, but the SVNN subsystem may also be configured to take in multiple input sequences and to output one or more multiple real-value sequences, as part of a single input-multiple output (SIMO), multiple input-single output (MISO), or multiple input-multiple output (MIMO) approaches. In some embodiments, SIMO, MISO, and MIMO approaches may include multiple SVNNs, each configured to generate a single output. Alternatively, an SVVN may be configured to generate multiple outputs. As such, SIMO and MIMO approaches may be implemented in a single SVNN model 112.

Figure 6:
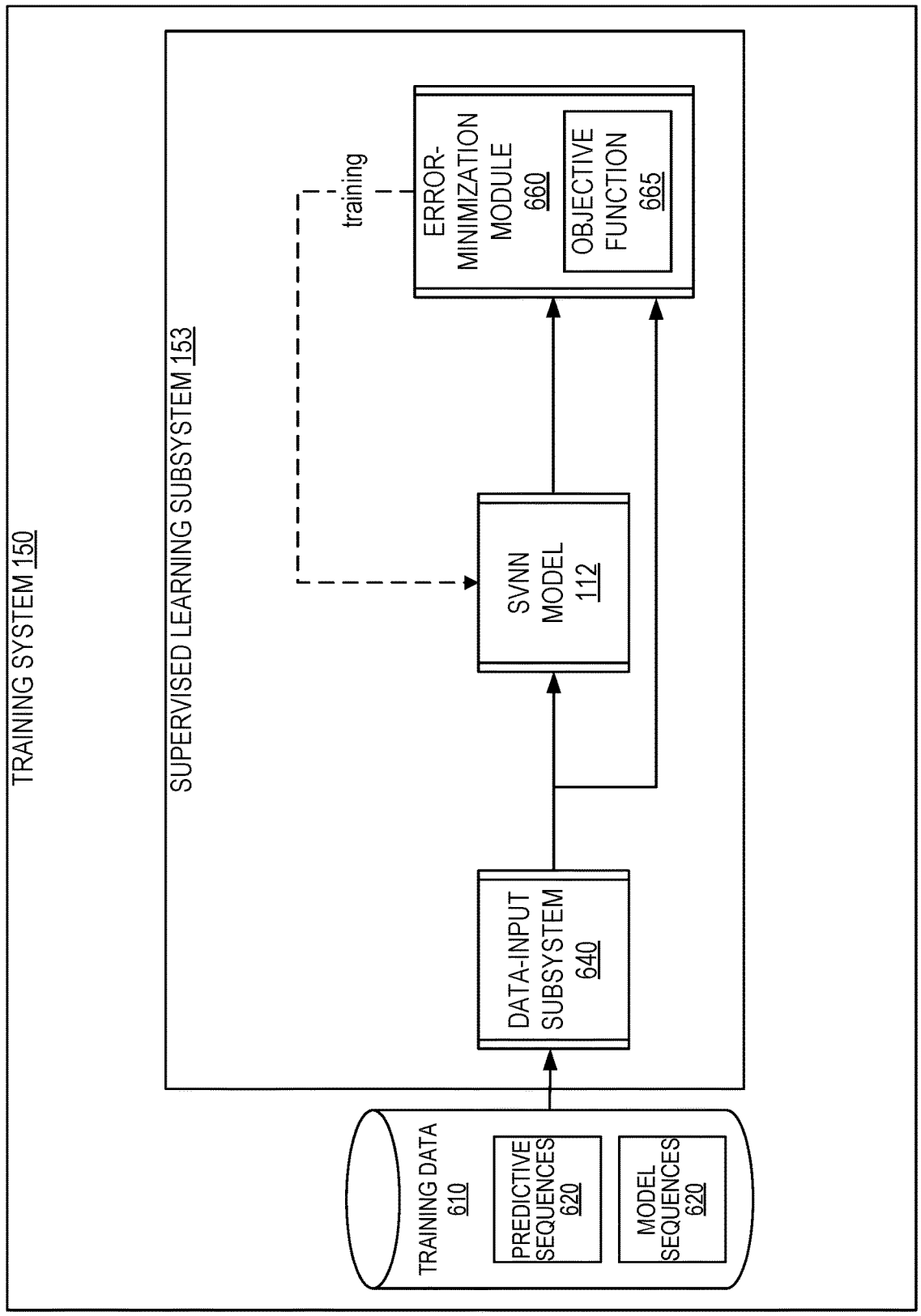
FIG. 6 is a diagram of a training system configured to train the SVNN of the SVNN subsystem, according to embodiments described herein.

For SISO and MISO approaches, the SVNN model 112 may be trained using training data to provide a corresponding output sequence, as described in more detail in reference to FIG. 6. As with SISO approaches, input training data and output training data (e.g., as part of labeled training data "tuples") may describe the same feature, such as daily power consumption, surface temperature, exchange rate, or sunspot number. In the case of MISO, the training data may include multiple training sets where the output data corresponds to a ground truth output on which to train the SVNN model 112. As an illustrative example, input training data may include temperature data and pressure data over a period of several thousand days, and the output training data may include the ground truth temperature data for the corresponding time period.

Where a single SVNN model 112 is configured to generate multiple outputs, the SVNN model 112 may be trained to generate multiple different outputs. For SIMO operation, the training data may include input training data for a first feature and output training data for multiple features. For example, the input training data may describe temperature data for a period of several thousand days, and the output training data may describe ground truth temperature data and pressure data corresponding period. In the case of MIMO, the input training data describes multiple features and the output data also describes multiple features. In some embodiments, for SIMO, MISO, or MIMO configurations, the SVNN model 112 may incorporate deep learning architecture, such as additional hidden layers with trainable weights and biases, such that each feature may be trained independently. As described in more detail in reference to FIG. 5, for SISO operation, the SVNN model 112 may include a single hidden layer with an input layer including a single input neuron and an output layer having a single output neuron, in contrast to a real value neural network, which may include a larger number of input and output neurons.

As shown in FIG. 1, in some embodiments, the training system 150 trains the SVNN, using supervised learning 153 and metacognitive training 155. In some embodiments, the training system 150 may be a constituent system of the value determining system 100 or it may be a separate system. The training system 150 may train the SVNN, as described in more detail in reference to FIGS. 6-7, using a labeled training set of relevant sedenion value data corresponding to a system for which the SVNN is to predict and/or model a sedenion output sequence. To that end, the training system 150 may access and/or receive one or more sets of training data, and may train the sedenion value neural network model 112 concurrently with implementing a metacognitive training technique. As described in more detail in reference to FIG. 7, the metacognitive element self-regulates the training of the SVNN by determining which samples of the training set to use, which to delete (e.g., those with which the SVNN has already been trained or those that will not influence the learned parameters of the neural network model), and which to retain for subsequent epochs.

In some embodiments, the value determining system 100 is improved over a conventional system by the use of this SVNN approach. In particular, implementing the SVNN machine-learning model, with the training system 150 approach, as described in reference to Examples 1-4, below, may improve the performance of the SVNN subsystem 110 in relation to other statistical and/or machine-learning approaches. For example, the SVNN subsystem 110 may improve both the accuracy (as measured by RMSE) and the training time, for example, by using a smaller training set. In addition, the memory cost of prediction and/or modelling of real value sequences may be reduced by implementing the SVNN, relative to a real value neural network, for example. As described in more detail in reference to FIG. 5, and Examples 1-4, below, the SVNN structure may include fewer neurons (e.g., half as many neurons for an equivalent number of layers) and/or fewer layers (e.g., a single hidden layer rather than a deeper structure). Implementing a relatively simpler structure may permit the value determining system 100 to perform prediction and/or modelling with improved computational performance, in terms of memory cost or computational complexity.

Advantageously, neural network operations used in traditional networks can also be implemented in a sedenion neural network. For example, an SVNN can include operations such as layer normalization, which normalizes sedenion weights in a certain layer. As another example, an SVNN can also include operations such as batch normalization, which normalize sedenion weights across batches of training data, where training data may be divided into batches to improve (e.g., speed up) training. As another example, an SVNN may also support drop out layers, where neurons in the networks are dropped randomly. As another example of operations that can be implemented using an SVNN, convolution can be implemented as a sedenion multiplication, which entails convolution across the dimensions of the sedenion vectors, or as a spatial convolution, which entails applying a convolution between different sedenions using a fixed index. As an example, a spatial convolution can be applied between real valued components of sedenion vectors in a manner identical to real value sequences. Similarly, the SVNN can apply dot product operations between sedenion vectors, as with vectors of real value numbers.

As described above, the various subsystems of the value determining system 100, working in cooperation, provide the functionality that enables the value determining system 100 to receive input data 104 and to predict and/or model real value sequences (e.g., as predicted future states of a nonlinear time series). The various subsystems described above may be implemented using a single computer system or using multiple computer systems working cooperatively. For example, for a device implementing the value determining system 100, the subsystems of the value determining system 100 described above may be implemented entirely on the device with which the user interacts. In some other implementations, some components or subsystems of the value determining system 100 may be implemented on the device with which the user interacts, while other components may be implemented remotely from the device, possibly on some other computing devices, platforms, or servers.

Figure 2:
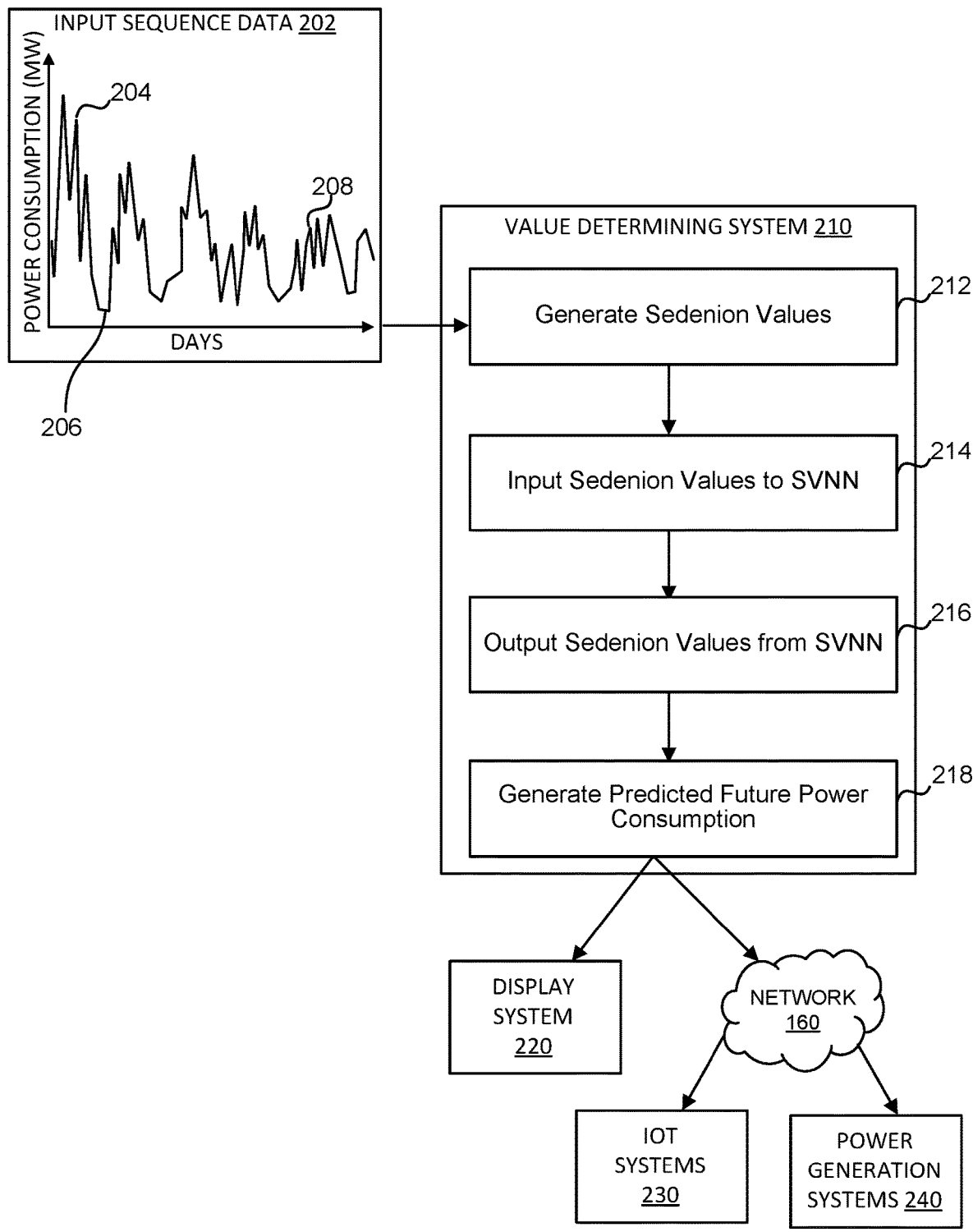
FIG. 2 is a diagram of a value determining system configured to predict future power consumption time series values, according to embodiments described herein.

FIG. 2 is a diagram of a value determining system 210 configured to predict future power consumption time series values, according to embodiments described herein. As an example of the type of real systems to which the value determining system 100 of FIG. 1 may be applied, the SVNN system 210 may be configured to take in input sequence data 202 describing time series power consumption for a geographic region, regional distribution grid, or the like, on a time scale of days. It should be noted that power consumption is intended merely as an exemplary application in a domain where characteristic data exhibit non-stationary and nonlinear dynamics. In the context of daily power consumption, factors influencing the daily value may include, but are not limited to, daily temperature, seasonal light levels, time of day, whether a day is a weekend or a week day, or a holiday. In this way, the confounding effect of various factors may lead to non-stationary periodicity in the time series that negatively impacts accuracy of prediction by statistical or real value machine-learning methods. In the example of the input sequence data 202, power consumption correlated to summer usage may be reflected by a high-consumption period 204, relative to a low-consumption period 206 corresponding to fall, when lower power loads are drawn for heating and cooling. That being said, broad cyclical patterns, such as those driven by seasonal changes, may vary and lead to a subsequent summer cycle 208 differing significantly to the high-consumption period 204. Such variability is referred to as non-stationary and nonlinear dynamics, and may result in significant error when a statistical fitting is attempted.

As described in reference to FIG. 1, the SVNN system 210 may obtain the input sequence data 202 and generate a sedenion value sequence as an input to a trained SVNN machine-learning model. In an exemplary technique for predicting future power consumption sequences, the SVNN system may generate the sedenion value sequence, at operation 212, by determining sedenion values using input sequence data 202. In some embodiments, the sedenion values generated at operation 212 may be stored as an input sequence, and may preserve a temporal correlation between consecutive values in the input sequence. As further described in connection with FIG. 3, and depending on the use case and/or the data type, input sequence data may preserve spatial information by, for example, using multi-dimensional sedenion vectors (e.g., W×H sedenion vectors).

Subsequent to generating the sedenion values, the SVNN system 210 may input the sedenion values to a trained SVNN at operation 214. As described in more detail in reference to FIG. 5, the SVNN may be or include a machine-learning model including a sedenion input layer, a hidden layer, and an activation layer, which has been trained to predict future power consumption data as a sedenion output sequence. In this way, the SVNN may be configured to take in the input sequence of power consumption data starting at a first time (e.g., time step t=0) at operation 214, and to generate an output sequence of power consumption data starting at second time in the future (e.g., time step t=1) at operation 216, both sequences including sedenion values to be converted into real values.

Subsequent generating the sedenion output at operation 216, the SVNN system 210 may generate a real value sequence from the sedenion output at operation 218, representing predicted future power consumption as a time series. A real value sequence may be reflected in the real component of the sedenion (e.g., $x_1$ of equation (1)) or may be determined by additional operations to prepare a real value sequence from the sedenion sequence, prior to outputting predicted power consumption data.

Subsequent generating the predicted future power consumption data, the SVNN system 210 may generate and our provide one or more outputs (e.g., using output component 116 of FIG. 1). For example, the SVNN system 210 may be in communication with a display system 220, such that a user of the SVNN system 210 may view one or more outputs of the operations as the SVNN system 210 processes the input sequence data 202. In some embodiments, the SVNN system 210 may generate and/or present, using the display system 220, a visualization of real value sequences (e.g., as a projected continuation of the input sequence data 202).

In some embodiments, the SVNN system 210 may be in communication with one or more associated systems via a network (e.g., network 160 of FIG. 1), through which the SVNN system 210 may facilitate one or more actions to be undertaken based on the predicted future power consumption data. In light of the improved accuracy and speed with which the SVNN system 210 predicts future power consumption data, relative to real value neural networks or statistical models, the SVNN system 210 may be configured to interface with internet of things (IoT) systems 230, such as heating, ventilation, and air conditioning (HVAC) system or thermostat systems, to improve efficiency of energy consumption patterns. As an illustrative example, water heaters may be scheduled in advance to avoid periods of predicted high consumption. Similarly, load balancing on the level of a generation grid may benefit from increasing power output of a generating station, rather than activating a peaking plant, where increased future demand may be accurately predicted within the lead time of the generating station. Similarly, a peaking plant may be scheduled in advance, where a short-term peak of demand is predicted that would introduce significant waste.

In this way, the SVNN system 210 may improve the efficiency and performance of power generation systems, such as regional grids, and may reduce inefficiency in power consumption, by providing improved predictive data for applications in management of generator capacity, consumption, or both.

Figure 3:
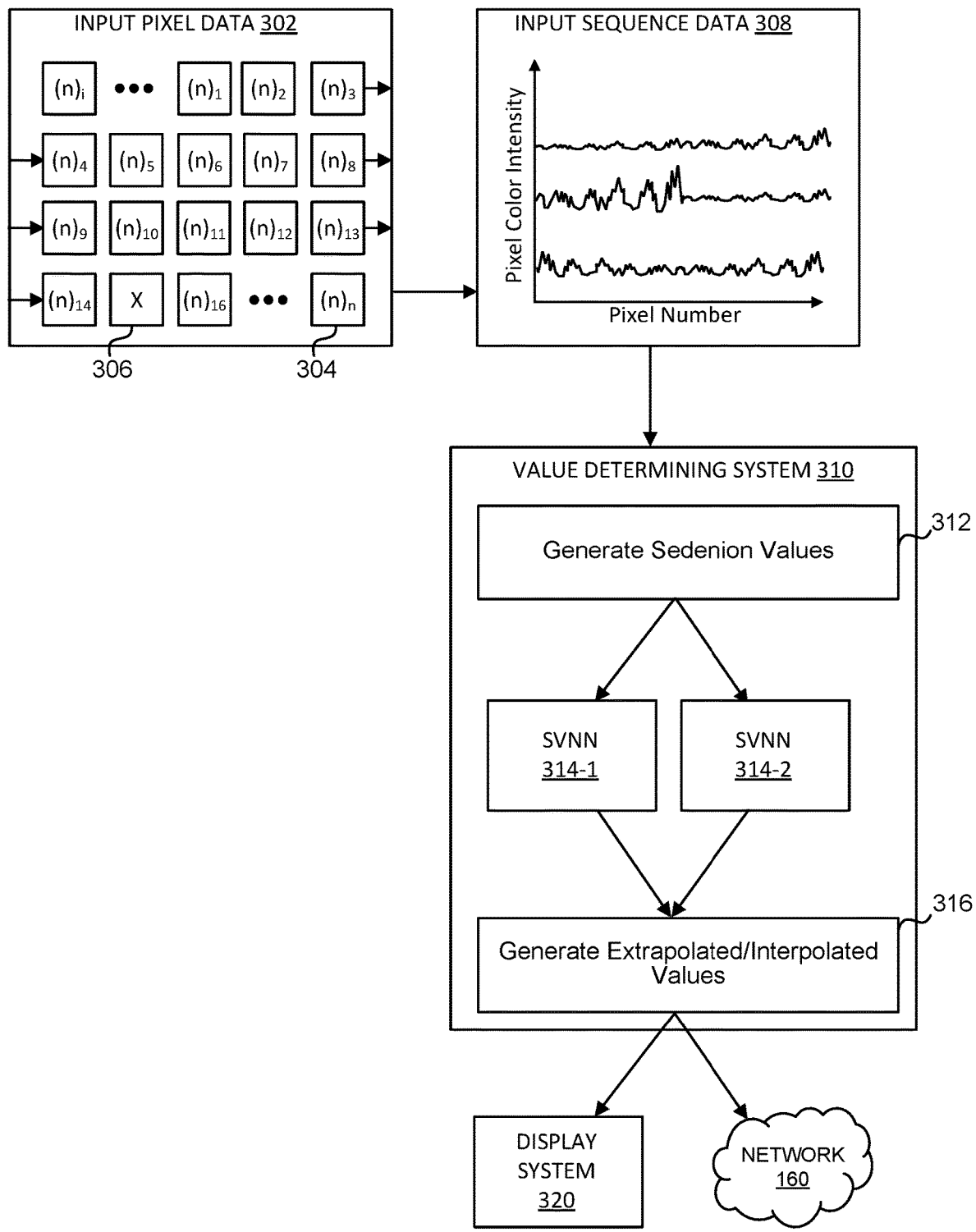
FIG. 3 is a diagram of a value determining system configured to model pixel intensity tuples, according to embodiments described herein.

FIG. 3 is a diagram of a value determining system 310 configured to model pixel intensity tuples 304, according to embodiments described herein. Similarly to the SVNN system 210 of FIG. 2, the SVNN system 310 may be configured to implement operations to model pixel intensity tuples 304 as part of image processing and/or computer vision. Input pixel data 302 may include a set of pixel intensity tuples 304, where each pixel intensity tuple 304 of the set describes intensity values for one or more colors. For example, a monochrome image (e.g., binary sepia-tone images) may include a positive intensity value for each entry in the input pixel data 302, corresponding to a pixel in an image (e.g., in a two-dimensional pixel array). Similarly, in multicolor images, the pixel intensity tuples 304 may include intensity values for each color (e.g., RGB, CMYK, or the like). In some applications, the SVNN may be configured to generate pixels as extrapolations or interpolations where the input pixel data 302 includes a missing tuple 306. Where color information is to be preserved, the SVNN system 310 may include multiple SVNN machine-learning models, each trained to predict one of the colors.

In some embodiments, the input sequence data 308 may be generated from an image or a series of images having as many as thousands of pixels, or more. The pixels making up an image may be converted from a two-dimensional array into a one dimensional sequence. The conversion may be implemented by combining rows into a single vector of pixel intensity tuples 304, as shown in FIG. 3. As such, correlation between rows (e.g., two dimensional correlation between neighboring pixels in both vertical and horizontal directions) may be reflected in non-stationary and nonlinear dynamics in pixel intensity sequences analogous to those observed in time series data described in reference to FIG. 2. As illustrated, the input sequence data 308 may be or include a number of real value sequences corresponding to the number of colors included in the input pixel data 302, as part of the pixel intensity tuples 304.

In some embodiments, rather than processing a single image, the input data 302 may be or include a sequence of images, such that the input sequence data 308 may be representative of a sequence of frames (e.g., a video sequence of sixteen frames), where each frame represents a regular image composed from W×H pixels (pixel width× pixel height). As such, rather than converting two-dimensional images into one-dimensional sequences, the sequence may be or include frames in sequence as a function of time. In this way, a sequence of two-dimensional frames may be used to generate W×H sedenion vectors and use this representation as input to an SVNN, for example, to predict a subsequent frame or to interpolate a missing frame. As such, sedenions may be used to represent changes over time without a loss of spatial information.

From the input sequence data 308, the SVNN system 310 may generate sedenion values at operation 312, as described in reference to FIGS. 1-2. For each color, the input sedenions may be provided to an SVNN 314 configured to model and/or generate extrapolated and/or interpolated pixel intensity values, at operation 316, as described in more detail in reference to FIG. 5. As illustrated in FIG. 3, the SVNN system may implement more than one SVNN machine-learning model. For example, to process input data from a two color image, the SVNN system 310 may implement a first SVNN 314-1 and a second SVNN 314-2. In this way, the SVNN system 310 may separate the input pixel data 302 into multiple input sequences, may generate a corresponding number of sedenion value sequences, provide the sedenion value sequences to SVNNs 314, generate sedenion output sequences, and generate real value sequences as outputs, from which pixel intensity tuples may be generated for new images and/or to repair image files (e.g., images with missing or corrupted pixels).

In some embodiments, the SVNN system 310 may output the pixel intensity tuples that are generated from the sedenion outputs of the SVNN(s) 314 (e.g., using output component 116 of FIG. 1). For example, the SVNN system 310 may be in communication with a display system 320, such as a monitor or a mobile electronic device, and may generate and/or present images by reconstructing images from the output of the SVNN system. Reconstructing images may include, but is not limited to, reversing the operations implemented to generate the input pixel sequences 302 from source images. In some embodiments, the SVNN system 310 may be in communication with computer systems via a network (e.g., network 160 of FIG. 1), such as distributed computing systems, servers, or associated systems configured to implement subsequent processing of image data.

Figure 4:
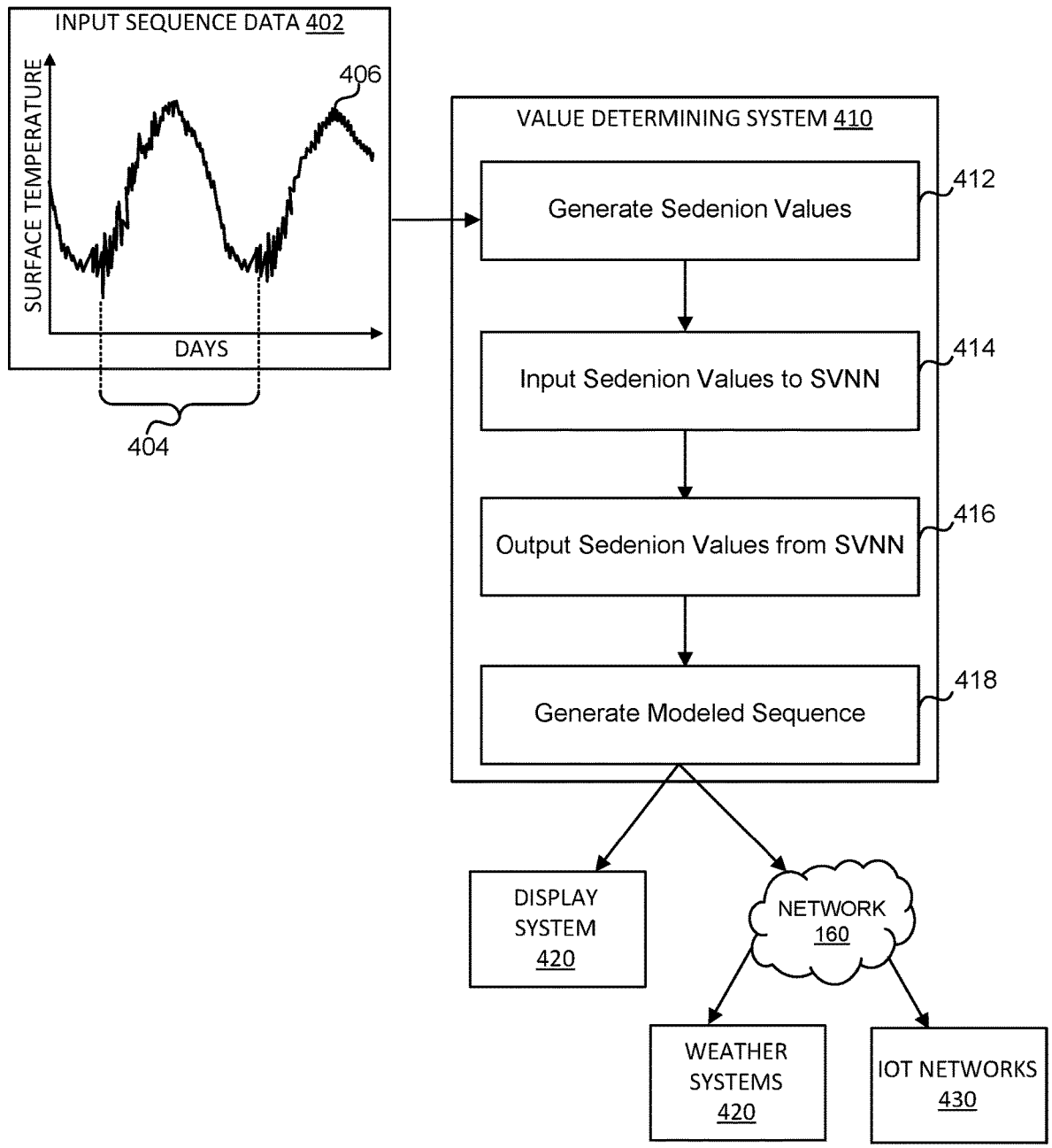
FIG. 4 is a diagram of a value determining system configured to model pressure time series data from temperature time series data, according to embodiments described herein.

FIG. 4 is a diagram of a value determining system 410 configured to model pressure time series data from temperature time series data, according to embodiments described herein. In meteorological or atmospheric systems, a high degree of complexity and interdependence between multiple natural systems introduces error into both prediction and modelling techniques. For example, ocean temperature, surface temperature, and other factors may influence local meteorological conditions. The multi-dimensional nature of weather modelling may permit a trained SVNN, as part of the value determining system 410, to provide improved accuracy of both prediction and modelling, relative to statistical techniques or real-value neural networks.

As an illustrative example of applying the value-determining system 410 to model meteorological conditions, input sequence data 402 represent a time series of surface temperature for a geographic region, as described in more detail in reference to Example 1, below. Surface temperature may be influenced by multiple factors that contribute to non-linear and non-stationary dynamics in the input sequence data 402. For example, while seasonal influence may introduce a period 404 to the data 402, daily temperature values may be influenced by higher-order factors, such as local weather systems (e.g. cold fronts), regional ocean temperature (e.g., la niña), or the like. For example, a summer period 406 may be cooler or warmer on average than a preceding summer period 406.

In some embodiments, the value determining system 410 is configured to implement operations of a method for modelling data using the input sequence data 402. For example, at operation 412 the value determining system 410 may prepare the input sequence data 402 for use with the SVNN by generating a sedenion value input sequence, which may be provided to an SVNN trained to model and/or predict meteorological data from the input sequence data 402. In some embodiments, the SVNN is trained to predict an output sedenion at operation 416 that can be used to generate future surface temperature values as a real value sequence at operation 418. In some embodiments, the SVNN is trained to model an output sedenion at operation 416 that can be used to generate pressure values as the real value sequence. For example, the SVNN may be configured to take in the sedenion value sequence and output a sedenion value sequence that models the atmospheric pressure in the same time frame described by the input sequence data 402. Alternatively, the SVNN may be configured to model future values for atmospheric pressure or other modelled values, as described in more detail in reference to FIGS. 1-2.

In some embodiments, the value determining system 410 may be configured to present output using a display system 420 (e.g., using output component 116 of FIG. 1), which may be or include display peripherals and/or user interface components of mobile electronic devices. Additionally or alternatively, the value determining system 410 may be configured to communicate with ancillary systems via a network (e.g., the network 160) to facilitate one or more applications of the SVNN output. For example, the value determining system 410 may provide real value output sequences (e.g., modeled pressure sequences) to weather systems 420. In another example, the value determining system 410 may be configured to facilitate the operation of IoT systems (e.g., "smart-home" appliances) that may interact with users to provide information updates, may implement automatic control strategies to adapt operation in response to the information provided from the value determining system 410, or the like.

In this way, the value determining system 410 may improve the operation of multiple systems that it is configured to communicate with. Furthermore, in light of the improved accuracy and reduced training time of SVNN machine-learning models relative to real-value neural networks, SVNNs may provide improved modelling capability as well as predictive capability, which may in turn improve the breadth of information available for systems to receive, such as informational systems and/or control systems.

As described in more detail in reference to FIG. 1, SVNNs may be configured for SIMO, MISO, or MIMO operation. In this way, the model outputs may include multiple real value sequences corresponding to different features. For example, for an input sequence 402 describing surface temperature, the output of the SVNN may include multiple features, such as surface temperature and atmospheric pressure, which may be predicted (e.g., future states of the model system). Similarly, the SVNN may take in both temperature and pressure sequences (e.g., multiple input sequences 402) and output a single sedenion value sequence for one of the input features or for a third feature (e.g., power consumption), where the SVNN has been trained to model a different output feature. Similarly for MIMO operation, where the SVNN may be trained to take in multiple input sequences and generate multiple output sequences.

Figure 5:
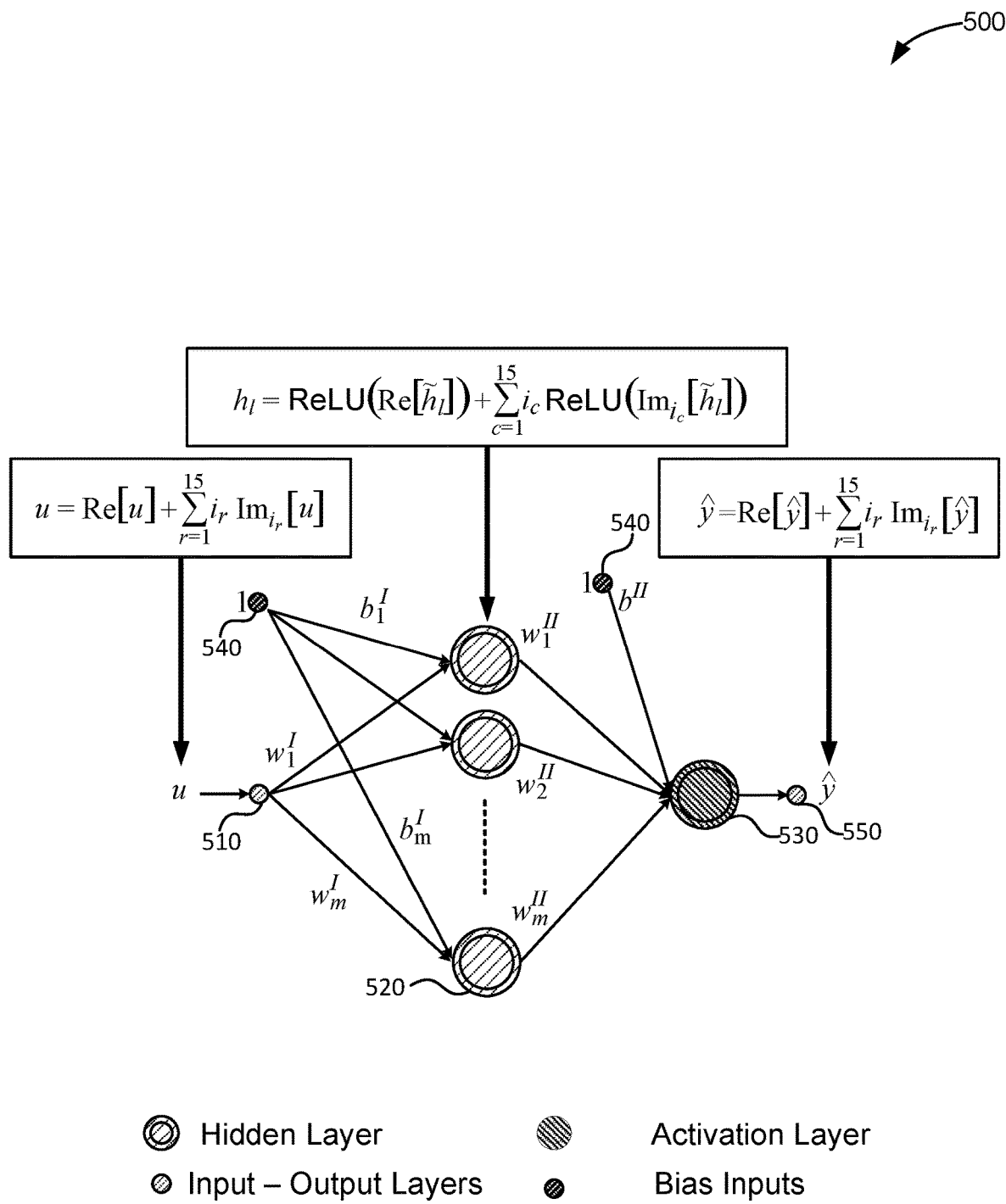
FIG. 5 is a schematic diagram of a sedenion value neural network, according to embodiments described herein.

FIG. 5 is a schematic diagram of a sedenion value neural network 500 (SVNN), according to embodiments described herein. The SVNN 500 is an example of a hypercomplex neural network that may be applied to modeling nonlinear, high-dimensional systems. SVNNs avoid loss of information when modeling correlated variables, and may be used to solve several problems in time-series forecasting, speech recognition, and computer vision. A sedenion is a 16-dimensional hypercomplex number that is obtained by applying the Cayley-Dickson construction to octonion complex numbers. Its algebra is non-commutative, non-associative, and non-alternative, but power-associative. Training data and all SVNN parameters are represented by sedenion numbers. When compared with real-valued networks, SVNNs offer an efficient and compact representation of input data that better captures the relationships between the data points.

As described in reference to FIG. 1, an SVNN is similar to a real-valued neural network, with the exception that all values inside and outside the SVNN 500 are sedenion numbers. In an illustrative example, the SVNN 500 has three layers: an input layer with one sedenion input 510, one hidden layer with m neurons 520, and one output layer with one neuron 530; these layers are associated with weights $w_m^I$ and $w_m^{II}$, respectively. In this example, the hidden and output layers have biases 540 $b_m^I$ and $b^{II}$, respectively. All network parameters, inputs, and outputs are sedenion valued. The derivation of the sedenion values for each layer, inputs and outputs, as well as training parameters, such as gradients, are detailed, below.

In some embodiments, an SVNN output 550 is computed using the following equation:

$$\hat{y} = \Phi(\text{Re}[\tilde{y}]) + \Sigma_{r=1}^{15} i_r \Phi(\text{Im}_{i_r}[\tilde{y}]) \quad (3)$$

where the symbols Re[.] and IM[.] represent the real and imaginary parts of $i_r$, with r=1, . . . , 15, respectively.

$\Phi$ is the nonlinear sigmoid function given by the following equation:

$$\Phi = \frac{1}{1 + e^{-(.)}} \quad (4)$$

$$\tilde{y} = \sum_{i=1}^{m} w_l^{II} h_l + b^{II} \quad (5)$$

where l=1, . . . , m, and $h_l$ is the $l^{th}$ hidden neuron's output, which is given by $$h_l = \text{ReLU}(\text{Re}[\tilde{h}_l]) + \Sigma_{c=1}^{15} i_c \text{ReLU}(\text{Im}_{i_c}[\tilde{h}_l]) \quad (6)$$

where $\tilde{h}_l$ is $$\tilde{h}_l = w_l^I u + b_l^I \quad (7)$$

The following equation gives the Rectified Linear Unit (ReLU) activation function:

$$\text{ReLU}(x) = \begin{cases} 0, & x < 0 \\ x, & x \geq 0 \end{cases} \quad (8)$$

and u is a sedenion-valued input.

The sedenion-valued backpropagation algorithm is the sedenion variant of the real-valued backpropagation algorithm. The objective is to optimize the network parameters that restrict the total sum-squared error at the output layer, which can be expressed as $$E = \tfrac{1}{2} e_c e = \tfrac{1}{2} \Sigma_d e_d e_d^* = \tfrac{1}{2} \Sigma_d E_d \quad (9)$$

$$E_d = e_d e_d^* = |e_d|^2 \quad (10)$$

The subset * represents the conjugate operator, C is the Cayley operator (i.e., the transpose of the conjugate), and d is the number of samples.

The error e between the desired output y and the estimated output $\hat{y}$ is $$e = y(k+1) - \hat{y}(k+1) = \text{Re}[e] + E_{r=1}^{15} i_r \, \text{Im}[e_{i_r}] \quad (11)$$

The algorithm used to optimize the parameters of the SVNN is given as follows: The bias $b^{II}$ is $$b^{II} = \text{Re}[b^{II}] + \Sigma_{r=1}^{15} i_r \, \text{Im}_{i_r}[b^{II}] \quad (12)$$

giving $$\nabla_{b^{II}} E = \frac{\delta E}{\delta \text{Re}[b^{II}]} + \Sigma_{r=1}^{15} i_r \frac{\delta E}{\delta \text{Im}_{i_r}[b^{II}]} \quad (13)$$

Using the derivative of the sigmoid function provides:

$$\nabla_{b^{II}} E = -\{\text{Re}[e](1 - \text{Re}[\hat{y}]) \cdot \text{Re}[\hat{y}] + \Sigma_{r=1}^{15} i_r \, \text{Im}_{i_r}[e](1 - \text{Im}_{i_r}[\hat{y}])\} \quad (14)$$

$$b^{II}(k+1) = b^{II}(k) - \eta \nabla_{b^{II}} E \quad (15)$$

for the weights $w_m^{II}$ $$w_m^{II}(k+1) = w_m^{II}(k) - \eta \nabla_{w_m^{II}} E \quad (16)$$

where $w_m^{II} = \text{Re}[w_m^{II}] + \sum_{r=1}^{15} i_r \text{Im}_{i_r}[w_m^{II}]$ and $\nabla_{w_m^{II}} E = \frac{\partial E}{\partial \text{Re}[w_m^{II}]} + \sum_{r=1}^{15} i_r \frac{\partial E}{\partial \text{Im}_{i_r}[w_m^{II}]}$ (17)

$$\nabla_{w_m^{II}} E = -h_m^* \cdot \{\text{Re}[e](1 - \text{Re}[\hat{y}]) \cdot \text{Re}[\hat{y}] + \sum_{r=1}^{15} i_r \text{Im}_{i_r}[e](1 - \text{Im}_{i_r}[\hat{y}]) \cdot \text{Im}_{i_r}[\hat{y}]\} \quad (18)$$

The same procedure is used for the bias $b_m^I$ and weights $w_m^I$, where $$b_m^I = \text{Re}[b_m^I] + i_1 \text{Im}_{i_1}[b_m^I] + \ldots + i_{15} \text{Im}_{i_{15}}[b_m^I] \tag{19}$$

$$w_m^I = \text{Re}[w_m^I] + i_1 \text{Im}_{i_1}[w_m^I] + \ldots + i_{15} \text{Im}_{i_{15}}[w_m^I] \tag{20}$$

Hence, the gradients are computed as follows $$\nabla_{b_m^I} E = \frac{\partial E}{\partial \text{Re}[b_m^I]} + \sum_{r=1}^{15} i_r \frac{\partial E}{\partial \text{Im}_{i_r}[b_m^I]} \tag{21}$$

$$\nabla_{b_m^I} E = -\{(\text{Re}[h_m] > 0) \cdot \text{Re}(\nabla_{b^{II}} E \cdot w_m^{II*}) + \\ \sum_{r=1}^{15} i_r (\text{Im}_{i_r}[h_m] > 0) \cdot \text{Im}_{i_r}(\nabla_{b^{II}} E \cdot w_m^{II*})\} \tag{22}$$

$$b_m^I(k+1) = b_m^I(k) - \eta \nabla_{b_m^I} E \tag{23}$$

$$\nabla_{w_m^I} E = \frac{\partial E}{\partial \text{Re}[w_m^I]} + \sum_{r=1}^{15} i_r \frac{\partial E}{\partial \text{Im}_{i_r}[w_m^I]} \tag{24}$$

$$\nabla_{w_m^I} E = -u^* \cdot \nabla_{w_m^I} E \tag{25}$$

$$w_m^I(k+1) = w_m^I(k) - \eta \nabla_{w_m^I} E \tag{26}$$

where $\eta$ is the learning rate.

FIG. 6 is a diagram of a training system 150 configured to train a sedenion value neural network model 112 of the SVNN subsystem 110, according to embodiments described herein. The training system 150 includes a supervised learning subsystem 153 for training the SVNN model 112, as part of a metacognitive technique, as described in more detail in reference to FIG. 7. As described above, the SVNN model 112 may be or include a the SVNN 500 of FIG. 5 and may be configured to take in sedenion value sequences and to output sedenion value sequences, as part of predicting and/or modeling non-linear or nonstationary data sequences (e.g., time-series data, image processing, etc.). Training the SVNN model 112 may include applying a supervised learning technique using one or more labeled sets of training data 610. Training data 610 may be drawn from a database of sequence data that the SVNN model 112 may be trained to identify. As such, the training data 610 may correspond to nonlinear systems modeled by the value determining system 100. In some embodiments, the training data includes time data sequences 620 (e.g., time series data) to be used in training the SVNN model 112 to predict future states of the relevant system corresponding to the time data sequences 620. As an illustrative example, the time data sequences may correspond to daily power consumption sequences, as described in more detail in reference to FIG. 2. In some embodiments, where the SVNN is trained to model a value, as described in more detail in reference to FIG. 4, the training data 610 may include model sequences 630, such that the supervised learning subsystem 153 may define an expected SVNN output using the model sequences 630.

As part of supervised training, the supervised learning subsystem 153 may use the training data 610 to define a ground truth, such that a data input subsystem 640 may provide sedenion values to the SVNN model as inputs and expected output sedenion values to an error minimization module 660. The error minimization module 660 may, in turn, implement an objective function 665, which may be an error function, for example, defined as an error value between the model output and the ground truth. In this way, training may include adjusting one or more weights and/or coefficients of the SVNN model 112 over multiple iterations until the value of the objective function converges to a global minimum. As described in more detail in reference to FIG. 5, the gradients used in training may include those provided in equations (21)-(26).

Figure 7:
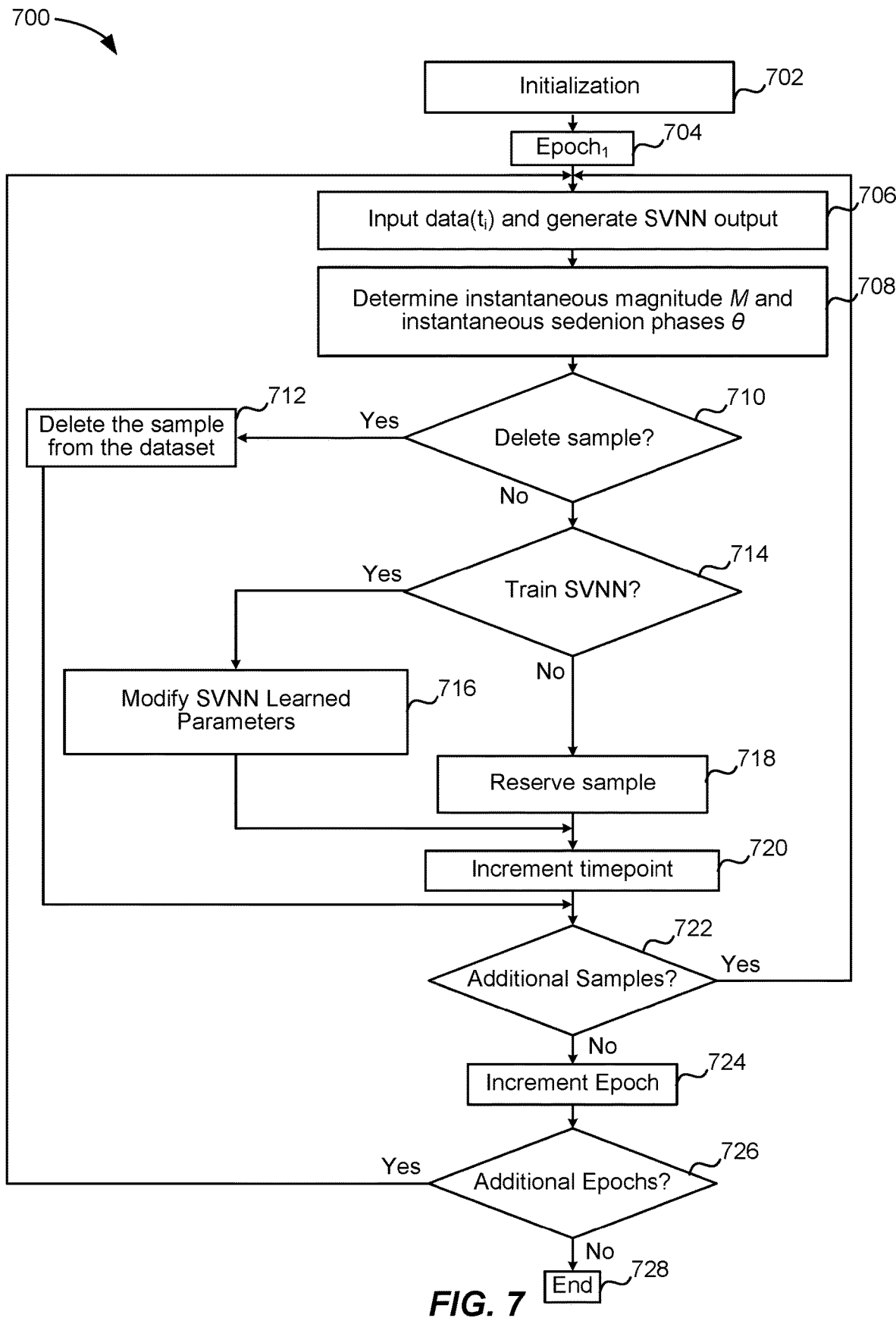
FIG. 7 is a block flow diagram of a method of training an SVNN model using supervised learning and metacognition techniques, according to embodiments described herein.

FIG. 7 is a block flow diagram of a method of training an SVNN model using supervised learning and metacognition techniques, according to embodiments described herein. A metacognitive learning technique 700 describes an approach to iterative training that can be used by the training system 150 described herein above, where, at each of a number of epochs, a metacognitive component (e.g., metacognitive training 155 of FIG. 1) decides whether a sample should be used for training, should be skipped, or should be deleted. The decision is made by comparing the prediction error of the current sample with self-regulating thresholds that control the speed of the learning process. This metacognitive learning strategy may improve prediction results and significantly improve the convergence time in multiple classifications and prediction problems. If the supervised training of FIG. 6 is used (e.g., supervised training system 153 of FIG. 6), the sample may be or include a training sample having a ground truth label (e.g., training data 610 of FIG. 6). Although the metacognitive training is described in reference to supervised training, the present disclosure is not limited as such. The metacognitive training can be used with other training strategies including, for instance, unsupervised training.

In metacognitive learning, hypercomplex error vectors are converted to a polar form (i.e., magnitude and phase values) before comparing them with the thresholds. Advantageously, magnitude and phase information provides a compact representation of the relationship between the different components of the vector. The metacognitive learning thresholds specify bounds on the magnitude and the fifteen phases of the sedenion vectors. The metacognitive training strategy includes determination of (i) magnitude in real-valued numbers and/or (ii) magnitude and phase in complex-valued numbers. In some embodiments, a method for computing the fifteen sedenion phases is applied to a metacognitive method for an SVNN as part of a self-regulating learning algorithm that utilizes the magnitude and the fifteen-dimensional phases of the sedenion prediction error vector.

As such, implementing metacognitive training as part of training an SVNN (e.g., SVNN 500 of FIG. 5) may improve the performance and accuracy of predictions of chaotic and non-linear systems. For example, a computer system implementing the SVNN and metacognitive techniques may improve the accuracy and predictive range for systems including, but not limited to, equivalent value problems, physical systems, such as weather or sunspot prediction, or power demand forecasting, as described in more detail in reference to FIGS. 2-4.

In some embodiments, the metacognitive training includes self-regulation of the learning algorithm of the SVNN by determining which samples to use, which to delete, and which to pass on (e.g., retain) to the next epochs. In metacognitive sedenion networks, the learning algorithm may be regulated by the instantaneous magnitude M and the fifteen phases $\theta_i$, where $i=1, \ldots, 15$, at each epoch. These parameters are computed using the residual SVNN's error e.

A derivation of the metacognitive criteria is provided, below. A hyperexponential form of sedenion vectors is used to compute the instantaneous sedenion magnitude and phase errors. The hyperexponential form of sedenion vectors is given by $$e = M(\cos\theta_1 + [i_1\cos\theta_2 + \quad (27)$$
$$[i_2\cos\theta_3 + [i_3\cos\theta_4 + [i_4\cos\theta_5 + [i_5\cos\theta_6 + [i_6\cos\theta_7 + [i_7\cos\theta_8 +$$
$$[i_8\cos\theta_9 + [i_9\cos\theta_{10} + [i_{10}\cos\theta_{11} + [i_{11}\cos\theta_{12} + [$$
$$i_{12}\cos\theta_{13} + [i_{13} + \cos\theta_{14} + [i_{14}\cos$$
$$\theta_{15} + i_{15}\sin\theta_{15}]\sin\theta_{14}]\sin\theta_{13}]\sin\theta_{12}]$$
$$\sin\theta_{11}]\sin\theta_{10}]\sin\theta_9]\sin\theta_8]\sin\theta_7]$$
$$\sin\theta_6]\sin\theta_5]\sin\theta_4]\sin\theta_3]\sin\theta_2]\sin\theta_1]$$

where M is the instantaneous magnitude error and is given by $$M = |e| = \frac{1}{s}\sqrt{e^C e} \quad (28)$$

Similarly, the instantaneous phase $\theta_i$ is given by $$\theta_i = a\tan\left(\frac{\sqrt{\sum_{p=2}^{16} x_p^2}}{x_i}\right) \quad (29)$$

The polar form is another way to define points on the square root sphere of negative one (i.e., by angles). It involves the hypercomplex factoring process:

$$i_{14}x_{15} + i_{15}x_{16} = \quad (30)$$
$$i_{14}(x_{15} - i_1 x_{16}) = (x_{15} + i_1 x_{16})i_{14} = r_{15}i_{14}e^{-i_1\theta_{15}} = r_{15}e^{i_1\theta_{15}}i_{14}$$
where $r_{15}^2 = x_{15}^2 + x_{16}^2$, and $\tan\theta_{15} = \frac{x_{16}}{x_{15}}$ Hence, $(i_{14}\cos\theta_{15} + i_{15}\sin\theta_{15})^2 = i_{14}e^{-i_1\theta_{15}}e^{i_1\theta_{15}}i_{14} = -1$. This polar form can be substituted into $$i_{13}x_{14} + i_{14}x_{16} = i_{13}x_{14} + i_{14}(x_{15} - i_1 x_{16}) = \quad (31)$$
$$i_{13}x_{14} + (x_{15} - i_1 x_{16})i_{14} = r_{14}e^{i_1\theta_{15}}i_{3\theta_{14}i_{13}}$$
where $r_{14}^2 = x_{14}^2 + r_{15}^2 = x_{14}^2 + x_{15}^2 + x_{16}^2$,
and $\tan\theta_{15} = \frac{\sqrt{x_{15}^2 + x_{16}^2}}{x_{14}}$ Similarly, $$i_{12}x_{13} + i_{13}x_{14} + i_{14}x_{15} + i_{15}x_{16} = r_{13}e^{i_1\theta_{15}i_{13}i_{13}} \quad (32)$$
Where $r_{13}^2 = x_{13}^2 + r_{14}^2 = x_{13}^2 + x_{14}^2 + x_{15}^2 + x_{16}^2$,
and $\tan\theta_{14} = \frac{\sqrt{x_{14}^2 + x_{15}^2 + x_{16}^2}}{x_{13}}$ By continuing the hypercomplex factoring process through all imaginary units, the following hyperexponential form may be obtained:

$$\sum_{n=1}^{15} i_n x_{n+1} = i_1 x_2 + r_2 e^{e^{\cdot^{\cdot^{i_1\theta_{15}}}}} i_3\theta_3 i_2 = \quad (33)$$
$$\left(x^2 r_2 e^{e^{\cdot^{\cdot^{i_1\theta_{15}}}}} i_1\theta_3\right) i_1 = r_2 e^{e^{\cdot^{\cdot^{i_1\theta_{15}}}}} i_3\theta_1$$

The following equation calculates the hyperexponential form of a sedenion:

$$\sigma = x_1 + \sum_{n=1}^{15} i_n x_{n+1} = r_2 e^{e^{\cdot^{\cdot^{i_1\theta_{15}}}}} i_1\theta_1 \quad (34)$$
where $r^2 = \sum_{n=1}^{16} x_n^2$, and $\tan\theta_1 = \frac{\sqrt{\sum_{p=2}^{16} x_p^2}}{x_1}$ At each epoch, the metacognitive learning component determines whether the sample should be used for training, skipped, or deleted based on the instantaneous phase and magnitude of the SVNN prediction error.

As illustrated in FIG. 7, the metacognitive technique 700 for training the SVNN implements three loops, based on an outcome of nested comparisons to two threshold values (e.g., a training threshold and a deletion threshold). The metacognitive technique 700 is described below as a series of operations that may be understood to be implemented by a computer system configured to train an SVNN (e.g., training system 150 of FIG. 1) as part of a value determining system (e.g., value determining system 100 of FIG. 1).

In some embodiments, the metacognitive technique 700 includes initializing the SVNN at operation 702. Initialization may include defining initial values for weights and biases (e.g., learned parameters) of the SVNN, as described in more detail in reference to FIG. 5. Subsequent initializing the SVNN, the metacognitive technique 700 may include defining an initial epoch number (e.g., 0 or 1) at operation 704. As an iterative technique, the number of epochs may be limited by external constraints, such as a resource allocation (e.g., a computational resource allocation in terms of processor time).

As part of the metacognitive decision making process, training data is provided to the SVNN, and the sedenion output is generated at operation 706. As described in more detail in reference to FIG. 6, the training data may be taken from a labeled input sequence, such that a comparison of the expected output and the actual output may be calculated, from which an error value may be determined. In this way, the instantaneous magnitude M, and the instantaneous sedenion phases θ may be determined at operation 708, as detailed above in reference to equations (28) and (29).

Subsequent determining the instantaneous magnitude and sedenion phases, the metacognitive technique 700 includes comparing the magnitude and sedenion phases to deletion threshold values, at decision operation 710. The deletion thresholds of the error magnitude and fifteen sedenion phases are $E_{d,M}$ and $E_{d,\theta_i}$, respectively. In some embodiments, if the magnitude and sedenion phases are less than the respective deletion threshold values, the sample is deleted. In sample deletion, at operation 712, the metacognitive technique 700 includes eliminating a sample from the training dataset (i.e., in the following epochs, this sample is not used). The actual relation of the magnitude and sedenion phases to the deletion threshold values is relative to the manner in which the thresholds are defined. For example, a similar outcome may be defined such that the sample is deleted when the determined values are greater than the deletion threshold values.

By contrast, where the magnitude and sedenion phases do not satisfy the deletion threshold values (e.g., are greater than the deletion threshold values), the metacognitive technique 700 may include a second comparison to a training threshold at decision operation 714. Similarly to operation 710, the comparison may include threshold values such that when the magnitude and sedenion phases satisfy the training threshold values, the metacognitive technique 700 includes training the SVNN, at operation 716, using the data input at operation 706. In this stage, the training system (e.g., supervised learning 153 of FIG. 1) updates the weights and biases in the SVNN. In some embodiments, this action is performed when instantaneous errors are less than or equal to one of the training threshold values $E_{l,m}$ and $E_{d,\theta_i}$ of the magnitude and the fifteen phases, respectively. These thresholds may be self-regulated in the current epoch, based on the sample's residual error. The regularization process is given by the equations $E_{l,m}=\lambda E_{l,m}-(1-\lambda)M$ and $E_{i,\theta_i}=\lambda E_{i,\theta_i}-(1-\lambda)\theta_i$, where $\lambda$ ranges from 0 to 1. When $\lambda$ is close to 1, this allows the levels to decline from their initial values slowly. For example, $\lambda$ may be equal to 0.9998.

Where the outcome of the decision operation 714 results in the magnitude and sedenion phases failing to satisfy the deletion threshold values and the sedenion threshold values, the metacognitive technique 700 may include reserving the sample at operation 718. For example, operation 718 may include retaining the sample in the dataset, using it to train the SVNN in the current epoch of the metacognitive technique 700. Instead, the sample is kept for use in future epochs.

In this way, the metacognitive technique 700 may include multiple epochs of sample deletion, training, and reserving, within a single epoch, and for multiple epochs. For example, after training or reserving, a timepoint may be incremented at operation 720. The timepoint, in this context, describes a data point in an input sequence, as described in more detail in reference to FIGS. 2-4, drawn from a training set, as described in more detail in reference to FIG. 5. Where additional samples are available, the metacognitive technique 700 may repeat the operations 706-720 until the outcome of decision operation 722 is negative, such that another epoch may be begun by incrementing the epoch at operation 724, and providing another training sequence for an additional epoch after determining whether additional epochs are available at decision operation 726. When the outcome of the decision operation 726 is negative, the metacognitive technique 700 includes ending the SVNN training at operation 728.

Figure 8:
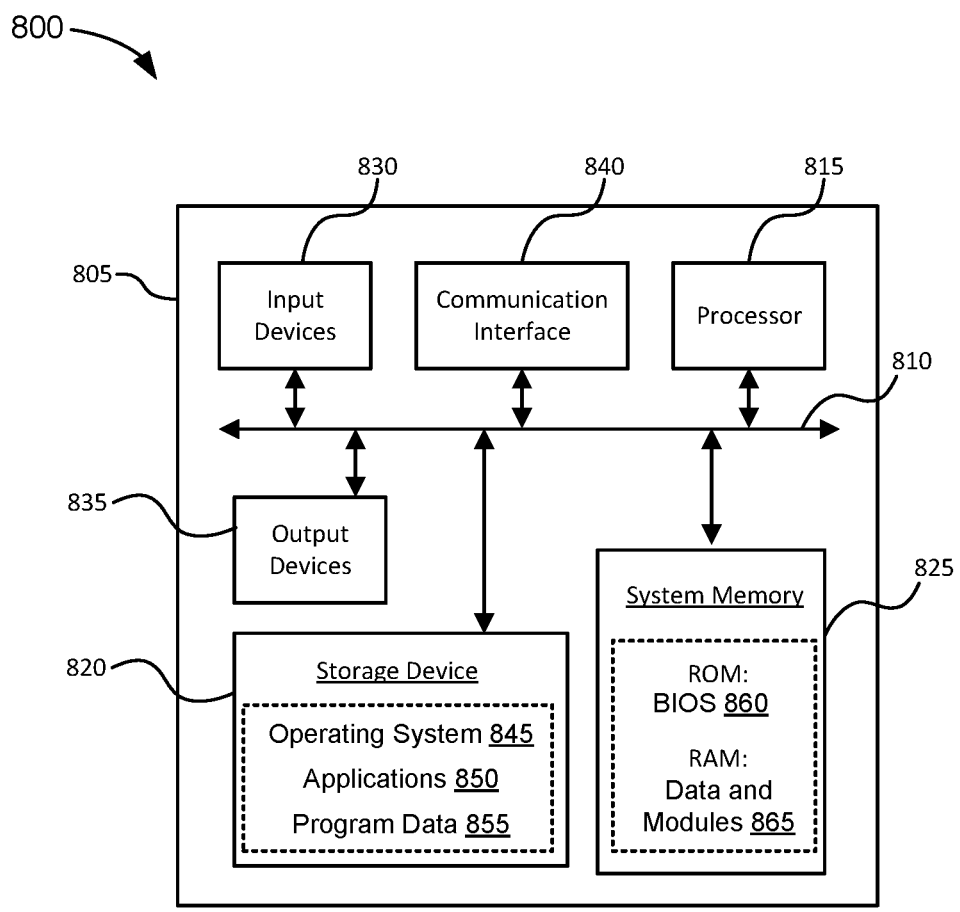
FIG. 8 is an illustrative architecture of a computing system implemented as some embodiments of the present disclosure.

FIG. 8 is an illustrative architecture of a computing system 800 implemented as some embodiments of the present invention. The computing system 800 is only one example of a suitable computing system and is not intended to suggest any limitation as to the scope of use or functionality of the present invention. Also, computing system 800 should not be interpreted as having any dependency or requirement relating to any one or combination of components illustrated in computing system 800.

As shown in FIG. 8, computing system 800 includes a computing device 805. The computing device 805 can be resident on a network infrastructure such as within a cloud environment, or may be a separate independent computing device (e.g., a computing device of a service provider). The computing device 805 may include a bus 810, processor 815, a storage device 820, a system memory (hardware device) 825, one or more input devices 830, one or more output devices 835, and a communication interface 840.

The bus 810 permits communication among the components of computing device 805. For example, bus 810 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 805.

The processor 815 may be one or more processors, microprocessors, or specialized dedicated processors that include processing circuitry operative to interpret and execute computer readable program instructions, such as program instructions for controlling the operation and performance of one or more of the various other components of computing device 605 for implementing the functionality, steps, and/or performance of the present invention. In certain embodiments, processor 815 interprets and executes the processes, steps, functions, and/or operations of the present disclosure, which may be operatively implemented by the computer readable program instructions. For example, processor 815 can retrieve, e.g., import and/or otherwise obtain or generate sequence data, generate sedenion values from the sequence data, generate output sedenions using a sedenion value neural network, and output real-value sequences that may be or include predicted and/or modeled values. In embodiments, the information obtained or generated by the processor 815, e.g., the sequence data, the sedenion values, the output sequences, etc., can be stored in the storage device 820.

The storage device 820 may include removable/non-removable, volatile/non-volatile computer readable media, such as, but not limited to, non-transitory machine readable storage medium such as magnetic and/or optical recording media and their corresponding drives. The drives and their associated computer readable media provide for storage of computer readable program instructions, data structures, program modules and other data for operation of computing device 805 in accordance with the different aspects of the present invention. In embodiments, storage device 820 may store operating system 845, application programs 850, and program data 855 in accordance with aspects of the present invention.

The system memory 825 may include one or more storage mediums, including for example, non-transitory machine readable storage medium such as flash memory, permanent memory such as read-only memory ("ROM"), semi-permanent memory such as random access memory ("RAM"), any other suitable type of non-transitory storage component, or any combination thereof. In some embodiments, an input/output system 860 (BIOS) including the basic routines that help to transfer information between the various other components of computing device 805, such as during start-up, may be stored in the ROM. Additionally, data and/or program modules 865, such as at least a portion of operating system 845, program modules, application programs 850, and/or program data 855, that are accessible to and/or presently being operated on by processor 815, may be contained in the RAM. In embodiments, the program modules 865 and/or application programs 850 can comprise, for example, a processing tool to identify and annotate sequence data, a metadata tool to append data structures with metadata, and one or more SVNNs to predict and/or model real value sequences, which provides the instructions for execution of processor 815.

The one or more input devices 830 may include one or more mechanisms that permit an operator to input information to computing device 805, including, but not limited to, a touch pad, dial, click wheel, scroll wheel, touch screen, one or more buttons (e.g., a keyboard), mouse, game controller, track ball, microphone, camera, proximity sensor, light detector, motion sensors, biometric sensor, and combinations thereof. The one or more output devices 835 may include one or more mechanisms that output information to an operator, such as, but not limited to, audio speakers, headphones, audio line-outs, visual displays, antennas, infrared ports, tactile feedback, printers, or combinations thereof.

The communication interface 840 may include any transceiver-like mechanism (e.g., a network interface, a network adapter, a modem, or combinations thereof) that enables computing device 805 to communicate with remote devices or systems, such as a mobile device or other computing devices such as, for example, a server in a networked environment, e.g., cloud environment. For example, computing device 805 may be connected to remote devices or systems via one or more local area networks (LAN) and/or one or more wide area networks (WAN) using communication interface 840.

As discussed herein, computing system 800 may be configured to train one or more SVNNs to predict and/or model real-value sequence data from input sequences for time-series data, non-linear data, or other sequence data (e.g., pixel-sequences, natural language sequences, or the like). In particular, computing device 805 may perform tasks (e.g., process, steps, methods and/or functionality) in response to processor 815 executing program instructions contained in non-transitory machine readable storage medium, such as a system memory 825. The program instructions may be read into system memory 825 from another computer readable medium (e.g., non-transitory machine readable storage medium), such as data storage device 820, or from another device via the communication interface 840 or server within or outside of a cloud environment. In embodiments, an operator may interact with computing device 805 via the one or more input devices 830 and/or the one or more output devices 835 to facilitate performance of the tasks and/or realize the end results of such tasks in accordance with aspects of the present invention. In additional or alternative embodiments, hardwired circuitry may be used in place of or in combination with the program instructions to implement the tasks, e.g., steps, methods and/or functionality, consistent with the different aspects of the present invention. Thus, the steps, methods and/or functionality disclosed herein can be implemented in any combination of hardware circuitry and software.

In the preceding description, various embodiments have been described. For purposes of explanation, specific configurations and details have been set forth in order to provide a thorough understanding of the embodiments. However, it will also be apparent to one skilled in the art that the embodiments may be practiced without the specific details. Furthermore, well-known features may have been omitted or simplified in order not to obscure the embodiment being described.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes and workflows disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the description to provide a thorough understanding of the embodiments. However, it will be understood that the embodiments may be practiced without these specific details. For example, specific computational models, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Example 1—Sedenion Hypercomplex Neural Networks for Prediction of Sunspot Number Time Series'

The performance of the developed Mc-SVNN is evaluated using three real-world forecasting problems: sunspot number time series, power demand forecasting, and the daily temperature of Abu Dhabi. These examples have been chosen because of their nonstationarity and nonlinearity. For a fair comparison, all networks use an equal number of input and output parameters, and the number of hidden neurons is increased until an increase in prediction error is observed. Forecasting accuracy of the proposed algorithm is observed with the statistical and machine learning methods SMA, EMA, TMA, MMA, ARMAX, and ARIMA and the networks RVNN, CVNN, FCRBF, QVNN, OVNN, LSTM and the hybrid LSTM-SARIMA model. Evaluation criteria used in this paper are the non-dimensional error index (NDEI), the normalized root mean squared error (nRMSE), the mean absolute error (MAE), and the mean absolute percentage error (MAPE).

The mean arctangent absolute percentage error (MAAPE) is used instead of MAPE in the sunspot number prediction problem to avoid dividing by zero.

These metrics are given as follows:

$$nRMSE(\%) = \frac{\sqrt{\frac{1}{N}\Sigma_{k=1}^{N}|y_k - \hat{y}_k|^2}}{\bar{y}} \times 100\% \quad (35)$$

$$NDEI = \frac{\sqrt{\frac{1}{N}\Sigma_{k=1}^{N}|y_k - \hat{y}_k|^2}}{\sqrt{\frac{1}{N}\Sigma_{k=1}^{N}|y_k - \bar{y}_k|^2}} \quad (36)$$

$$MAE = \frac{1}{N}\sum_{k=1}^{N}|y_k - \hat{y}_k| \quad (37)$$

$$MAPE = \frac{1}{N}\sum_{k=1}^{N}\left|\frac{y_k - \hat{y}_k}{y_k}\right| \quad (38)$$

$$MAAPE = \frac{1}{N}\sum_{k=1}^{N}\arctan\left|\frac{y_k - \hat{y}_k}{y_k}\right| \quad (39)$$

where $y_k$ is the $k^{th}$ sample value in y, $\hat{y}_k$ is the forecasted value, $\bar{y}$ is the average value of the signal y, and N is the total number of samples.

Forecasting solar activity in general and sunspot cycle amplitude and length, in particular, is elemental in space weather research. The prediction of the time series of sunspot numbers is still an open challenge because these datasets are strongly nonstationary, and their nature is not apparent.

Training and test data used in example are those for mean monthly sunspot observations collected at the Royal Observatory of Belgium from 1749 to 2019. The 2780 samples were divided into two parts; the first 1000 samples were used for training and the remaining 1780 were used for validation. An exemplary metacognitive-SVNN (Mc-SVNN) architecture contained three layers: one input, five neurons in the hidden layer, and one output. The sedenion input contained sixteen months of data from the sunspot numbers time series. Training thresholds were initialized as $E_{d,M}=E_{d,\theta_i}=0.2$ and $E_{l,m}=E_{l,\theta_i}=0.3$.

Numerical comparisons between one-step-ahead forecasting using Mc-SVNN with conventional techniques are presented in Table 1. The Mc-SVNN reduced the number of samples from 1000 at the start to 775 toward the end of the training process. Other metacognitive methods could delete a smaller number of samples.

TABLE 1

USD-EURO EXCHANGE RATE ONE-STEP-AHEAD FORECASTS BY MC-SVNN AND OTHER STRATEGIES

| | Network | Neurons (I, H, O) | Parameters | nRMSE (%) | NDEI | MAE | MAPE | [a]Time | [b]Samples |
|---|---|---|---|---|---|---|---|---|---|
| Without metacognition | SMA | — | — | 2.9306 | 0.5046 | 0.0187 | 0.0214 | — | 4000 |
| | EMA | — | — | 2.5618 | 0.4411 | 0.0161 | 0.0184 | — | 4000 |
| | TMA | — | — | 3.1115 | 0.5358 | 0.0200 | 0.0229 | — | 4000 |
| | MMA | — | — | 3.7153 | 0.6397 | 0.0230 | 0.0261 | — | 4000 |
| | ARMAX | — | — | 2.1686 | 0.3734 | 0.0145 | 0.0164 | — | 4000 |
| | SARIMA | — | — | 1.9772 | 0.3416 | 0.0129 | 0.0146 | — | 4000 |
| | LSTM | 100 (16, 100, 16) | 211200 | 1.1640 | 0.2104 | 0.0081 | 0.0090 | 6415.23 | 4000 |
| | LSTM-SARIMA [31] | 100 (16, 100, 16) | 211200 | 1.0865 | 0.2089 | 0.0073 | 0.0083 | 6427.35 | 4000 |
| | RVNN | 66 (16, 50, 16) | 1666 | 1.7837 | 0.3224 | 0.0132 | 0.0149 | 11844.77 | 4000 |
| | CVNN | 28 (8, 20, 8) | 696 | 1.8801 | 0.3398 | 0.0139 | 0.0156 | 10117.98 | 4000 |
| | FCRBF [10] | 35 (8, 35, 8) | 1680 | 1.8538 | 0.3350 | 0.0122 | 0.0138 | 12430.58 | 4000 |
| | QVNN [2] | 34 (4, 30, 4) | 1468 | 1.5413 | 0.2786 | 0.0090 | 0.0102 | 9530.98 | 4000 |
| | OVNN [8] | 17 (2, 15, 2) | 848 | 1.3996 | 0.2530 | 0.0080 | 0.0091 | 11203.15 | 4000 |
| | SVNN | 11 (1, 10, 1) | 496 | 0.9848 | 0.1521 | 0.0075 | 0.0085 | 8346.78 | 4000 |
| With metacognition | Mc-RVNN | 66 (16, 50, 16) | 1666 | 1.7576 | 0.3176 | 0.0130 | 0.0146 | 9821.54 | 3962 |
| | Mc-CVNN | 28 (8, 20, 8) | 696 | 1.8799 | 0.3397 | 0.0139 | 0.0156 | 10507.23 | 3999 |
| | Mc-FCRBF | 35 (8, 35, 8) | 1680 | 2.0150 | 0.3641 | 0.0133 | 0.0150 | 9629.31 | 3856 |
| | Mc-QVNN | 34 (4, 30, 4) | 1468 | 1.2772 | 0.2309 | 0.0084 | 0.0095 | 9871.13 | 3892 |
| | Mc-OVNN | 17 (2, 15, 2) | 848 | 1.3072 | 0.2363 | 0.0088 | 0.0099 | 6329.28 | 3867 |
| | Mc-SVNN | 11 (1, 10, 1) | 496 | 0.9793 | 0.1512 | 0.0066 | 0.0075 | 5147.72 | 2444 |

[a]Time for training (seconds)
[b]Number of samples at the end of the training procedure.

TABLE 2

SUNSPOT NUMBER ONE-STEP-AHEAD FORECASTING BY DIFFERENT LEARNING STRATEGIES

| Network | Neurons (I, H, O) | Parameters | nRMSE (%) | NDEI | MAE | MAAPE | [a]Time | [b]Samples |
|---|---|---|---|---|---|---|---|---|
| SMA | — | — | 86.6668 | 1.1281 | 69.9674 | 0.7118 | — | 1000 |
| EMA | — | — | 69.2625 | 0.9016 | 54.7939 | 0.6423 | — | 1000 |
| TMA | — | — | 105.0795 | 1.3678 | 85.4265 | 0.7832 | — | 1000 |
| MMA | — | — | 73.6943 | 0.9593 | 58.4372 | 0.6582 | — | 1000 |
| ARMAX | — | — | 45.2648 | 0.5892 | 32.8219 | 0.4539 | — | 1000 |
| SARIMA | — | — | 66.2110 | 0.8616 | 47.5052 | 0.5597 | — | |
| LSTM | 200 (16, 200, 16) | 422400 | 45.3463 | 0.5917 | 31.3416 | 0.3866 | 3526.33 | 1000 |
| LSTM-SARIMA [31] | 200 (16, 200, 16) | 422400 | 36.4609 | 0.4794 | 23.0403 | 0.4479 | 3538.85 | 1000 |
| Mc-RVNN | 76 (16, 60, 16) | 1996 | 39.4810 | 0.5174 | 29.9380 | 0.4548 | 6719.88 | 971 |
| Mc-CVNN | 23 (8, 15, 8) | 263 | 96.9633 | 1.3816 | 79.5549 | 0.7531 | 3453.70 | 994 |
| Mc-FCRBF | 45 (8, 45, 8) | 720 | 60.4709 | 0.8652 | 43.8150 | 0.5459 | 2450.44 | 991 |
| Mc-QVNN | 14 (4, 10, 4) | 376 | 36.6456 | 0.4782 | 25.8039 | 0.3835 | 1387.66 | 989 |
| Mc-OVNN | 9 (2, 7, 2) | 296 | 39.4170 | 0.5144 | 28.1865 | 0.4089 | 733.97 | 953 |
| Mc-SVNN | 6 (1, 5, 1) | 256 | 31.3270 | 0.4104 | 21.8850 | 0.3522 | 223.36 | 775 |

[a]Time for training (seconds)
[b]Number of samples at the end of the training procedure.

The Mc-SVNN improved nRMSE, NDEI, MAE, and MAAPE values by approximately 14%, 14%, 5%, and 21%, respectively, when compared to the hybrid LSTM-SARIMA model, which showed the nearest nRMSE and MAE. The Mc-SVNN also took less time for training (223.36 s), whereas the other strategies took 733.97 s to 6719.88 s.

Example 2—Sedenion Hypercomplex Neural Networks for Prediction of Daily Power Consumption Electric energy is traded in electricity markets across the world. Power demand forecasting and optimization play an important role in the electrical industry because it provides the basis for decision-making in the planning and operation of power systems. Electrical companies use many methods to predict the demand for electricity that is applicable for short, medium, and long-term forecasting. The data used in this example comprise the power consumption in the eastern area of the United States presented by PJM Interconnection LLC, which is a U.S. regional transmission organization (RTO), from Dec. 31, 2004 to Jul. 29, 2018.

The area concerned is part of the eastern interconnection grid, which operates an electrical transmission system that serves all or parts of Delaware, Illinois, Indiana, Kentucky, Maryland, Michigan, New Jersey, North Carolina, Ohio, Pennsylvania, Tennessee, Virginia, West Virginia and the District of Columbia. The hourly power consumption data were in megawatts (MW). The hourly power was averaged to daily data to reduce the number of samples. There were 5242 daily power samples used in the current study, from which 4000 samples were used to train the network, and the rest were used for validation. The values $E_{d,M}=E_{d,\theta_i}=0.2$ and $E_{l,M}=E_{l,\theta_i}=0.3$ were used for the delete and learning thresholds, respectively. The Mc-SVNN had one sedenion input, 10 sedenion neurons in the hidden layer, and one sedenion output. FIG. 10 shows the original and predicted power for the next day. A numerical comparison of results is shown in Table 3. The Mc-SVNN algorithm is advantageous for predicting power consumption compared to other strategies (Table 3). The proposed Mc-SVNN was the best-performing algorithm with nRMSE=5.9%, NDEI=0.47, MAE=0.68× $10^3$ and MAPE=0.045.

The Mc-SVNN deleted 383 samples from the initial dataset, while the other metacognitive models could delete 221 samples (Mc-QVNN), 154 samples (Mc-OVNN), 30 samples (Mc-FCRBF), 10 samples (Mc-CVNN) and 28 samples (Mc-RVNN). The Mc-SVNN was approximately 32% to 64% faster than the other neural-network-based models.

TABLE 3

PREDICTIONS OF DAILY POWER CONSUMPTION BY DIFFERENT STRATEGIES

| Network | Neurons (I, H, O) | Parameters | nRMSE (%) | NDEI | MAE ($10^3$) | MAPE | [a]Time | [b]Samples |
|---|---|---|---|---|---|---|---|---|
| SMA | — | — | 13.5500 | 1.0800 | 1.6357 | 0.1098 | — | 4000 |
| EMA | — | — | 11.3464 | 0.9043 | 1.3484 | 0.0905 | — | 4000 |
| TMA | — | — | 14.5524 | 1.1599 | 1.7634 | 0.1183 | — | 4000 |
| MMA | — | — | 12.0779 | 0.9627 | 1.4428 | 0.0970 | — | 4000 |
| ARMAX | — | — | 9.6360 | 0.7680 | 1.1088 | 0.0740 | — | 4000 |
| SARIMA | — | — | 13.0031 | 1.0337 | 1.5213 | 0.1018 | — | |

TABLE 3-continued

PREDICTIONS OF DAILY POWER CONSUMPTION BY DIFFERENT STRATEGIES

| Network | Neurons (I, H, O) | Parameters | nRMSE (%) | NDEI | MAE ($10^3$) | MAPE | [a]Time | [b]Samples |
|---|---|---|---|---|---|---|---|---|
| LSTM | 200 (16, 200, 16) | 422400 | 8.1239 | 0.6501 | 0.9232 | 0.0623 | 6871.18 | 4000 |
| LSTM-SARIMA [31] | 200 (16, 200, 16) | 422400 | 7.4451 | 0.7145 | 0.8832 | 0.0586 | 6877.37 | 4000 |
| Mc-RVNN | 76 (16, 50, 16) | 1666 | 10.8970 | 0.8651 | 1.2444 | 0.0831 | 5369.93 | 3972 |
| Mc-CVNN | 28 (8 × 20 × 8) | 696 | 10.8606 | 0.8622 | 1.3371 | 0.0909 | 6737.13 | 3990 |
| Mc-FCRBF | 35 (8, 35, 8) | 1680 | 10.0901 | 0.8010 | 1.1878 | 0.0804 | 5306.76 | 3970 |
| Mc-QVNN | 34 (4, 30, 4) | 1096 | 7.1634 | 0.5689 | 0.8201 | 0.0550 | 4185.79 | 3779 |
| Mc-OVNN | 17 (2, 15, 2) | 616 | 6.5996 | 0.5242 | 0.7500 | 0.0503 | 3612.16 | 3846 |
| Mc-SVNN | 6 (1, 5, 1) | 256 | 5.8699 | 0.4662 | 0.6762 | 0.0454 | 2437.28 | 3617 |

[a]Number of samples at the end of the training procedure.
[b]Time for training (seconds)

Example 3—Sedenion Hypercomplex Neural Networks for Prediction of Daily Surface Temperature Temperature forecasting is one of the most critical factors in studies on the impact of climate on agriculture, vegetation, water resources, and tourism. The daily temperature data of Abu Dhabi for the last six years were obtained from public sources. From 2191 samples, 1000 were used to train the network, and the 1191 were used for validation. The Mc-SVNN model was used with the following architecture: one sedenion input containing the past sixteen samples of the daily temperature, five neurons in the hidden layer, and one sedenion output. The values $E_{d,M}=E_{d,\theta_i}=0.2$ and $E_{l,m}=E_{l,\theta_i}=0.2$ were used for the delete and learning thresholds, respectively. A numerical comparison of the proposed architecture and other strategies is presented in Table 4. The Mc-SVNN reduced the number of training samples from 1000 at the beginning of the training process to 692 at the end of the metacognitive training process.

TABLE 4

FORECASTS OF THE TEMPERATURE IN ABU DHABI BY DIFFERENT STRATEGIES

| Network | Neurons (I, H, O) | Parameters | nRMSE (%) | NDEI | MAE | MAPE | [a]Time | [b]Samples |
|---|---|---|---|---|---|---|---|---|
| SMA | — | — | 15.6960 | 0.7859 | 4.0341 | 0.1474 | — | 1000 |
| EMA | — | — | 13.1391 | 0.6579 | 3.3717 | 0.1236 | — | 1000 |
| TMA | — | — | 16.2209 | 0.8122 | 4.1707 | 0.1521 | — | 1000 |
| MMA | — | — | 17.1921 | 0.8608 | 4.4411 | 0.1637 | — | 1000 |
| ARMAX | — | — | 8.4967 | 0.4103 | 1.8725 | 0.0686 | — | 1000 |
| SARIMA | — | — | 9.3007 | 0.4490 | 2.1149 | 0.0788 | — | 1000 |
| LSTM | 200 (16, 200, 16) | 422400 | 6.8373 | 0.3287 | 1.5210 | 0.0566 | 3833.47 | 1000 |
| LSTM-SARIMA [31] | 200 (16, 200, 16) | 422400 | 4.7489 | 0.2224 | 0.9964 | 0.0377 | 3839.73 | 1000 |
| Mc-RVNN | 61 (16, 45, 16) | 1501 | 6.7107 | 0.3321 | 1.5372 | 0.0563 | 3967.08 | 957 |
| Mc-CVNN | 28 (8, 20, 8) | 376 | 4.1208 | 0.2234 | 0.8878 | 0.0331 | 5751.09 | 827 |
| Mc-FCRBF [10] | 30 (8, 30, 8) | 480 | 8.5552 | 0.4624 | 1.9542 | 0.0687 | 3937.72 | 937 |
| Mc-QVNN [2] | 14 (4, 10, 4) | 376 | 5.2762 | 0.2620 | 1.2028 | 0.0455 | 1834.75 | 782 |
| Mc-OVNN [8] | 12 (2 × 10 × 2) | 416 | 5.3131 | 0.2638 | 1.2368 | 0.0463 | 1698.48 | 888 |
| Mc-SVNN | 6 (1, 5, 1) | 256 | 3.8682 | 0.1920 | 0.8436 | 0.0320 | 1494.41 | 692 |

[a]Number of samples at the end of the training procedure.
[b]Time for training (seconds)

The Mc-SVNN achieved the best forecasting results (nRMSE=3.8682%, NDEI=0.1920, MAE=0.8436 and MAPE=0.0320), and it used fewer neurons and shorter training time (6 neurons and 1494.41 s). The neural network-based models performed better than the statistical methods. The Mc-SVNN improved nRMSE, NDEI, MAE, and MAPE values by approximately 6%, 14%, 5%, and 3%, respectively, when compared to the Mc-CVNN model that achieved results closest to the proposed method.

Example 4—Estimating Computation Improvements of Sedenion Hypercomplex Neural Networks Computational resource demand between SVNN and similarly structured real-valued networks are estimated. An exemplary network with $N_0$ inputs, $N_1$ hidden layer neurons, and $N_2$ output neurons was used for the estimation. The total number of parameters (weights and biases) in this network is given by $P=\Sigma_{p-1}^{2}(N_{p-1}+1)N_p$. A sedenion-valued variant of this network that takes one sedenion value as the input and predicts one sedenion number as the output has $P=3N_1+1$ sedenion parameters. It is equivalent to $48N_1+16$ real-valued parameters. The comparable real-valued network with sixteen inputs and sixteen outputs uses $33N_1+16$ parameters. The use of sedenion values increases the number of parameters by a factor of 1.5.

Similarly, the number of multiplications for each forward or backward pass is given by $M=\Sigma_{p-1}^{2}N_{p-1}N_p$. An SVNN that takes one sedenion input and predicts one sedenion output uses $2\times N_i$ sedenion multiplications, which is equivalent to $16\times16\times2\times N_i=512\times N_i$ real-valued multiplications. The comparable real-valued network with sixteen inputs and outputs involves $32\times N_1$ real-valued multiplications. The use of sedenion numbers increases the number of multiplications by a factor of 16.

Despite the increase in multiplication costs, SVNNs converge faster than real-valued networks. A comparison in prediction performance and convergence time between SVNN and real-valued neural networks with a number of hidden units $N_1=16$ is shown in the first two rows of Table 5. The results show that the RVNN achieved an nRMSE value of 2.05% in approximately 4580 s, while the SVNN achieved an nRMSE value of 1.13% in approximately 4242 s. Furthermore, the third row of table 5 shows that combining the SVNN with the metacognitive learning strategy achieves significant savings in computational time and improved predictions (nRMSE=1.06, Time=2783 s) over real value neural networks and sedenion value neural networks that do not include metacognitive training (e.g., metacognitive training strategy 155 of FIG. 1).

TABLE 5

COMPARISON BETWEEN RVNN, SVNN, AND MC-SVNN WITH A FIXED NUMBER OF HIDDEN NEURONS

| Network | Neurons (I, H, O) | Parameters | nRMSE (%) | Time |
|---|---|---|---|---|
| RVNN | 32 (16, 16, 16) | 544 | 2.0482 | 4580.62 |
| SVNN | 17 (1, 16, 1) | 784 | 1.1286 | 4241.64 |
| Mc-SVNN | 17 (1, 16, 1) | 784 | 1.0638 | 2783.75 |

What is claimed is:

1. A method implemented on a computer system, the method comprising:
   obtaining, from a data store or a user device, values associated with a feature for which a value is to be determined;
   generating an input sedenion using the values;
   inputting the input sedenion to a sedenion value neural network (SVNN) model that includes a plurality of network parameters, the SVNN configured to generate an output sedenion using the input sedenion, the output sedenion indicating a sedenion representation of the value to be determined, wherein each of (i) the input sedenion, (ii) the output sedenion, and (iii) each network parameter of the plurality of network parameters, are non-alternative and power-associative;
   generating a sequence of real values using the output sedenion, the sequence of real values comprising the value; and
   outputting, to the data store or to the user device, the sequence of real values.

2. The method of claim 1, wherein the SVNN model comprises:
   an input layer, configured to receive the input sedenion and to apply weights to the input sedenion;
   a hidden layer, configured to receive the weighted input sedenion from the input layer and to apply an activation function to the weighted sedenion value; and
   an activation layer, configured to receive the activated sedenion value and to apply a sigmoid function to the activated sedenion value.

3. The method of claim 2, wherein the activation function comprises a rectifier linear unit (ReLU) function.

4. The method of claim 1, wherein the value to be determined is extrapolated from a sequence of values, and wherein the values comprise the sequence of values.

5. The method of claim 1, further comprising training the SVNN using a metacognitive selection technique, comprising:
   obtaining deletion threshold values, training threshold values, and a training sequence associated with the value to be determined;
   inputting a training sedenion of the training sequence to the SVNN;
   generating a training output of the SVNN;
   estimating a magnitude and a plurality of sedenion phases of the training output;
   comparing the magnitude and the sedenion phases to the deletion threshold values; and
   in accordance with the magnitude and the sedenion phases satisfying the deletion threshold values:
      comparing the magnitude and the sedenion phases to the training threshold values; and
         in accordance with the magnitude and the sedenion phases satisfying the training threshold values, training the SVNN using the training sedenion; or
         in accordance with the magnitude and the sedenion phases not satisfying the training threshold values, reserving the training sedenion for a subsequent epoch of the metacognitive selection technique.

6. The method of claim 5, wherein training the SVNN using the training sedenion comprises:
   generating a training output of the SVNN using the training sedenion;
   estimating an error using the training output and an expected output from the training sequence; and
   modifying one or more parameters of the SVNN in accordance with an objective function.

7. The method of claim 5, wherein:
   the magnitude of the training output is estimated by $$M = |e| = \frac{1}{s}\sqrt{e^C e};$$

the plurality of sedenion phases are estimated by $$\theta_i = \arctan\left(\frac{\sqrt{\sum_{p=2}^{16} x_p^2}}{x_i}\right);$$

and

M is the magnitude, $\theta_i$ is the plurality of sedenion phases, e is Euler's number, $x_p$ is a real value input, and C is the Cayley operator.

8. The method of claim 1, wherein each of (i) the input sedenion, (ii) the output sedenion, and (iii) each network parameter of the plurality of network parameters, are further non-commutative and non-associative.

9. The method of claim 1, wherein the SVNN is a trained model according to a training process that includes a combination of metacognitive selection training and supervised training.

10. The method of claim 1, wherein:
obtaining the values associated with the feature comprises obtaining more than 16 real values relating to time series power consumption for a geographic region;
generating the input sedenion comprises generating the input sedenion using the times series power consumption; and
generating the sequence of real values comprises generating, using the output sedenion, a sequence of real values relating to a prediction of power consumption for the geographic region.

11. A computer system comprising:
one or more data processors; and
one or more memory devices storing computer-readable instructions that, upon execution by the one or more data processors, configure the computer system to:
obtain, from a data store or a user device, an input sequence associated with a feature for which a value is to be determined;
generate an input sedenion using the input sequence;
input the input sedenion to a sedenion value neural network (SVNN) model that includes a plurality of network parameters, the SVNN configured to generate an output sedenion using the input sedenion, the output sedenion indicating a sedenion representation of the value to be determined, wherein each of (i) the input sedenion, (ii) the output sedenion, and (iii) each network parameter of the plurality of network parameters, are non-alternative and power-associative;
generate a sequence of real values using the output sedenion, the sequence of real values comprising the value; and
output, to the data store or to the user device, the sequence of real values.

12. The computer system of claim 11, wherein the SVNN model comprises:
an input layer, configured to receive the input sedenion and to apply a weighting vector to the input sedenion;
a hidden layer, configured to receive the weighted input sedenion from the input layer and to apply an activation function to the sedenion value; and
an activation layer, configured to receive an output of the hidden layer and to apply a sigmoid function to the output of the hidden layer.

13. The computer system of claim 12, wherein the activation function comprises a rectifier linear unit.

14. The computer system of claim 11, wherein the value to be determined is a predicted future state of a system, and wherein the input sequence comprises historical data describing the system.

15. The computer system of claim 11, wherein the computer-readable instructions, upon execution by the one or more data processors, further configure the computer system to implement metacognitive training of the SVNN, comprising:
obtaining deletion threshold values, training threshold values, and a training sedenion from a training sequence associated with the value to be determined;
inputting the training sedenion to the SVNN;
generating a training output of the SVNN;
estimating a magnitude and a plurality of phases of the training output;
comparing the magnitude and the phases to the deletion threshold values; and
in accordance with the magnitude and the phases satisfying the deletion threshold values:
comparing the magnitude and the phases to the training threshold values; and
in accordance with the magnitude and the phases satisfying the training threshold values, training the SVNN using the training sedenion; or
in accordance with the magnitude and the phases not satisfying the training threshold values, reserving the training sedenion for a subsequent epoch of the metacognitive selection technique.

16. The computer system of claim 15, wherein training the SVNN using the training sedenion comprises:
generating a training output of the SVNN using the training sedenion;
estimating an error using the training output and an expected output corresponding to the training sedenion; and
modifying one or more parameters of the SVNN in accordance with an objective function.

17. A non-transitory computer readable storage medium, storing instructions that, upon execution by one or more data processors of a computer system, configure the computer system to:
obtain, from a data store or a user device, an input sequence associated with a feature for which a value is to be determined;
generate an input sedenion using the input sequence;
input the input sedenion to a sedenion value neural network (SVNN) model that includes a plurality of network parameters, the SVNN configured to generate an output sedenion using the input sedenion, the output sedenion indicating a sedenion representation of the value to be determined, wherein each of (i) the input sedenion, (ii) the output sedenion, and (iii) each network parameter of the plurality of network parameters, are non-alternative and power-associative;
generate a sequence of real values using the output sedenion, the sequence of real values comprising the value; and
output, to the data store or to the user device, the sequence of real values.

18. The non-transitory computer readable storage medium of claim 17, wherein the SVNN model comprises:
an input layer, configured to receive the input sedenion and to apply a weighting vector to the input sedenion;
a hidden layer, configured to receive the weighted input sedenion from the input layer and to apply an activation function to the sedenion value; and an activation layer, configured to receive an output of the hidden layer and to apply a sigmoid function to the output of the hidden layer.

19. The non-transitory computer readable storage medium of claim 17, wherein the output sedenion is a first output sedenion, the feature is a first feature, the value to be determined is a first value to be determined, and wherein the SVNN model is further configured to generate, using the input sedenion, a second output sedenion indicating a sedenion representation of a second value to be determined for a second feature.

20. The non-transitory computer readable storage medium of claim 17, wherein the input sequence is a first input sequence, the output sedenion is a first output sedenion, the feature is a first feature, the value to be determined is a first value to be determined, and wherein the SVNN model is further configured to input a second input sedenion generated from a second input sequence and to generate, using the second input sedenion, a second output sedenion indicating a sedenion representation of a second value to be determined for a second feature.

* * * * *